(12) United States Patent
Osoda et al.

(10) Patent No.: US 7,483,864 B2
(45) Date of Patent: Jan. 27, 2009

(54) ACTIVE LEARNING METHOD AND SYSTEM

(75) Inventors: Tsutomu Osoda, Minato-ku (JP);
Yoshiko Yamashita, Minato-ku (JP)

(73) Assignee: NEC Corporation, Tokyo (JP)

( * ) Notice: Subject to any disclaimer, the term of this patent is extended or adjusted under 35 U.S.C. 154(b) by 60 days.

(21) Appl. No.: 10/579,336

(22) PCT Filed: Oct. 8, 2004

(86) PCT No.: PCT/JP2004/014917

§ 371 (c)(1),
(2), (4) Date: May 15, 2006

(87) PCT Pub. No.: WO2005/048184

PCT Pub. Date: May 26, 2005

(65) Prior Publication Data

US 2007/0094158 A1    Apr. 26, 2007

(30) Foreign Application Priority Data

Nov. 17, 2003    (JP) ............................. 2003-386702

(51) Int. Cl.
*G06F 15/18* (2006.01)
(52) U.S. Cl. .................................................. 706/12
(58) Field of Classification Search .................. None
See application file for complete search history.

(56) References Cited

U.S. PATENT DOCUMENTS 6,463,930 B2 * 10/2002 Biondi et al. .......... 128/204.21
6,487,276 B1 * 11/2002 Rosen et al. ................ 379/1.04
6,584,973 B1 * 7/2003 Biondi et al. .......... 128/204.21
6,668,829 B2 * 12/2003 Biondi et al. .......... 128/204.21
6,741,676 B2 * 5/2004 Rudinsky et al. ......... 379/27.04
6,839,656 B1 * 1/2005 Ackermann et al. ....... 705/36 R
6,875,816 B2 * 4/2005 DeGroot et al. ............. 525/240

(Continued)

FOREIGN PATENT DOCUMENTS

JP         11-16754         11/1999

(Continued)

OTHER PUBLICATIONS

Classification of robotic sensor streams using non-parametric statistics Lenser, S.; Veloso, M.; Intelligent Robots and Systems, 2004. (IROS 2004). Proceedings. 2004 IEEE/RSJ International Conference on vol. 3, Sep. 28-Oct. 2, 2004 pp. 2719-2724 vol. 3 Digital Object Identifier 10.1109/IROS.2004.1389820.*

(Continued)

*Primary Examiner*—Michael B Holmes
(74) *Attorney, Agent, or Firm*—Sughrue Mion, PLLC

(57) ABSTRACT

An active learning system samples known data, and learns the known data independently in a plurality of learning machines, and selects data to be next learned for unknown data. The active learning system comprises a sampling weighting device for weighting the known data when they are sampled, a prediction weighting device for weighting the learning results of the learning machines when they are integrated, and a data weighting device for weighting the learning results when the data to be next learned is selected. When an extreme deviation is present in the count of data, each of the weighting devices more heavily weights a larger count of data.

30 Claims, 19 Drawing Sheets

U.S. PATENT DOCUMENTS

| | | | |
|---|---|---|---|
| 6,901,137 B2 * | 5/2005 | Rosen et al. | 379/1.03 |
| 6,924,342 B2 * | 8/2005 | Stevens et al. | 526/113 |
| 6,954,756 B2 * | 10/2005 | Arning et al. | 707/101 |
| 6,973,446 B2 * | 12/2005 | Mamitsuka et al. | 706/50 |
| 7,017,574 B2 * | 3/2006 | Biondi et al. | 128/204.21 |
| 7,033,577 B2 * | 4/2006 | Dueva-Koganov et al. | 424/59 |
| 7,136,518 B2 * | 11/2006 | Griffin et al. | 382/133 |
| 7,143,046 B2 * | 11/2006 | Babu et al. | 704/500 |
| 7,148,305 B2 * | 12/2006 | Stevens et al. | 526/352 |
| 7,152,029 B2 * | 12/2006 | Alshawi et al. | 704/1 |
| 7,167,871 B2 * | 1/2007 | Farahat et al. | 707/102 |
| 7,188,117 B2 * | 3/2007 | Farahat et al. | 707/101 |
| 7,271,221 B2 * | 9/2007 | Stevens et al. | 525/240 |
| 7,282,723 B2 * | 10/2007 | Schomacker et al. | 250/458.1 |
| 7,300,983 B2 * | 11/2007 | Degroot et al. | 525/240 |
| 7,309,867 B2 * | 12/2007 | Costa et al. | 250/458.1 |
| 7,318,051 B2 * | 1/2008 | Weston et al. | 706/12 |
| 7,328,146 B1 * | 2/2008 | Alshawi et al. | 704/1 |
| 7,334,578 B2 * | 2/2008 | Biondi et al. | 128/204.23 |

FOREIGN PATENT DOCUMENTS

| | | |
|---|---|---|
| JP | 2001-229026 | 8/2001 |
| JP | 2001-249912 | 9/2001 |

OTHER PUBLICATIONS

Fuzzy Naive Bayes classifier based on fuzzy clustering Yongchuan Tang; Wuming Pan; Haiming Li; Yang Xu; Systems, Man and Cybernetics, 2002 IEEE International Conference on vol. 5, Oct. 6-9, 2002 p. 6 pp. vol. 5.*

Non-Parametric Time Series Classification Lenser, S.; Veloso, M.; Robotics and Automation, 2005. ICRA 2005. Proceedings of the 2005 IEEE International Conference on Apr. 18-22, 2005 pp. 3918-3923.*

Fuzzy modeling of an activated sludge process Shimakawa, M.; Murakami, S.; Mori, M.; Systems, Man, and Cybernetics, 1999. IEEE SMC '99 Conference Proceedings. 1999 IEEE International Conference on vol. 2, Oct. 12-15, 1999 pp. 558-563 vol. 2 Digital Object Identifier 10.1109/ICSMC.1999.825321.*

Feature Selection for Classification Using Decision Tree Tahir, Nooritawati Md; Hussain, Aini; Samad, Salina Abdul; Ishak, Khairul Anuar, Halim, Rosmawati Abdul; Research and Development, 2006. SCOReD 2006. 4th Student Conference on Jun. 27-28, 2006 pp. 99-102 Digital Object Identifier 10.1109/SCORED.2006.4339317.*

Generating F0 contours from ToBI labels using linear regression Black, A.W.; Hunt, A.J.; Spoken Language, 1996. ICSLP 96. Proceedings., Fourth International Conference on vol. 3, Oct. 3-6, 1996 pp. 1385-1388 vol. 3 Digital Object Identifier 10.1109/ICSLP.1996.607872.*

Minimizing regret with label efficient prediction Cesa-Bianchi, N.; Lugosi, G.; Stoltz, G.; Information Theory, IEEE Transactions on vol. 51, Issue 6, Jun. 2005 pp. 2152-2162 Digital Object Identifier 10.1109/TIT.2005.847729.*

Value-Added Metrology Bunday, B.; Allgair, J.; Caldwell, M.; Solecky, E.; Archie, C.; Rice, B.; Singh, B.; Cain, J.; Emami, I.; Semiconductor Manufacturing, IEEE Transactions on vol. 20, Issue 3, Aug. 2007 pp. 266-277 Digital Object Identifier 10.1109/TSM.2007.901851.*

Classification of Time-Sequential Attributes by Using Sequential Pattern Rules Ya-Han Hu; Yen-Liang Chen; Er-Hsuan Lin; Fuzzy Systems and Knowledge Discovery, 2007. FSKD 2007. Fourth International Conference on vol. 2, Aug. 24-27, 2007 pp. 735-739 Digital Object Identifier 10.1109/FSKD.2007.217.*

Inverse method 3-D reconstruction of localized in vivo fluorescence-application to Sjogren syndrome Chernomordik, V.; Hattery, D.; Gannot, I.; Gandjbakhche, A.H.; Selected Topics in Quantum Electronics, IEEE Journal of vol. 5, Issue 4, Jul.-Aug. 1999 pp. 930-935 Digital Object Identifier 10.1109/2944.796313.*

Multiple cue integration in transductive confidence machines for head pose classification Balasubramanian, V.; Panchanathan, S.; Chakraborty, S.; Computer Vision and Pattern Recognition Workshops, 2008. CVPR Workshops 2008. IEEE Computer Society Conference on Jun. 23-28, 2008 pp. 1-8 Digital Object Identifier 10.1109/CVPRW.2008.4563070.*

Analysis of discharge magnitude and discharge luminescence of phase angle area on tree initiation Fukawa, Y.; Urano, K.; Ehara, Y.; Kishida, H.; Ito, T.; Electrical Insulation and Dielectric Phenomena, 1998. Annual Report. Conference on Oct. 25-28, 1998 pp. 633-636 vol. 2 Digital Object Identifier 10.1109/CEIDP.1998.732977.*

From lattices of phonemes to sentences: a recurrent neural network approach looss, C.; Neural Networks, 1991., IJCNN-91-Seattle International Joint Conference on vol. ii, Jul. 8-14, 1991 pp. 833-838 vol. 2 Digital Object Identifier 10.1109/IJCNN.1991.155442.*

A range-based SLA and edge driven virtual core provisioning in DiffServ-VPNs Khalil, I.; Braun, T.; Local Computer Networks, 2001. Proceedings. LCN 2001. 26th Annual IEEE Conference on Nov. 14-16, 2001 pp. 12-21 Digital Object Identifier 10.1109/LCN.2001.990763.*

A force study of on-chip magnetic particle transport based on tapered conductors Wirix-Speetjens, R.; Fyen, W.; Kaidong Xu; Jo De Boeck; Borghs, G.; Magnetics, IEEE Transactions on vol. 41, Issue 10, Oct. 2005 pp. 4128-4133 Digital Object Identifier 10.1109/TMAG.2005.855345.*

Effect of Sub-Pixel Variability and Land-Cover on Soil Moisture Retrieval From Radarsat-1 Data Lakhankar, T.; Ghedira, H.; Azar, A.; Khanbilvardi, R.; IEEE MicroRad, 2006 2006 pp. 187-192 Digital Object Identifier 10.1109/MICRAD.2006.1677086.*

Naoki Abe, et al. "Nodou Gakushu to Hakken Kagaku (Active Learning and Discovery Science)," in "Hakken Kagaku to Deta Mainingu (Discovery Science and Data Mining)," Jun. 2001, ISBN 4-320-12018-3, pp. 64-71.

* cited by examiner

ACTIVE LEARNING METHOD AND SYSTEM

This application claims proirity from PCT Application No. PCT/JP2004/014917 filed Oct. 8, 2004, and from Japanese Patent Application No. 2003-386702 filed Nov. 17, 2003, which applications are incorporated herein by reference.

TECHNICAL FIELD

The present invention relates to an active learning method and an active learning system.

BACKGROUND ART

According to Abe et al, active learning is a learning form in which a learner can actively select learning data ([1] Naoki Abe, Hiroshi Mamitsuka, "Nodou Gakushu to Hakken Kagaku (Active Learning and Discovery Science)," in "Hakken Kagaku to Deta Mainingu (Discovery Science and Data Mining)," edited by Shinichi Morishita, Satoru Miyano, Kyoritsu Shuppan, Jun. 2001, ISBN 4-320-12018-3, pp. 64-71), It has been generally known that an learning efficiency can be improved in terms of the count of data and computational amount by actively performing the learning. A system which performs the active learning is called an active learning system. Consider, for example, a learning system which statistically analyzes collected data, and predicts results for data having unknown label values from a tendency of past data. The active learning system can be applied to such a learning system. In the following, a general description will be given of this type of active learning system.

Assume that there exist data having unknown label values and data having known label values. Learning is performed with the data having known label values, and the result of the learning is applied to the data having unknown label values. In this event, the learning system selects data with which the learning can be efficiently performed from the data having unknown label values, and delivers the data. The delivered data is subjected to an experiment or an investigation to derive results for the data having unknown label values. The results are entered and merged with the data having known label values, and then the learning is performed in a similar manner. On the other hand, data from which the results have been derived are deleted from a set of the data having unknown label values. The active learning system repeatedly performs such operations.

Also, data is expressed in the following manner. One data is described with a plurality of attributes and a so-called label. For example, there is "golf" within famous evaluation data. This determines whether or not the golf should be played or not, and is described by four items: weather, temperature, humidity, and wind force. The weather takes a value "fair," "cloudy," or "rainy" while the wind takes a value "present" or "absent." The temperature and humidity are real values. For example, one data is described as: weather: fair, temperature: 15° C., humidity: 40%, wind: absent, play: done. In this data, the four items, weather, temperature, humidity, and wind are called attributes. Also, the result of play done or not done is called a label. In this description, when the possible values of the label are discrete values, the value is particularly called a "class."

Now, a variety of terms will be defined.

Suppose that the label is binary. Out of the two values, a noted label is a positive instance, while the other one is a negative instance. Also, with a multi-value label, one noted label is a positive instance, while all except for that are negative instances. When a label can take a continuous value, a label value located near a noted value is called a positive instance, while one located at another position is called a negative instance.

Indexes for measuring the accuracy of learning include an ROC (receiver operating characteristic) curve, a hit rate, a transition in correct answer rate and the like. In the following description, these three indexes are used to make evaluations.

The ROC curve is defined in the following manner:

Horizontal Axis: (Count of Data Determined to be Positive Instances within Negative Instances)/(Total Count of Negative Instances), Vertical Axis: (Count of Data Determined to be Positive Instances within Positive Instances)/(Total Count of Positive Instances).

When a random prediction is made, the ROC curve appears to be a diagonal which connects the origin with (1, 1).

The hit rate is defined in the following manner:

Horizontal Axis: (Count of Data Having Known Label Values)/{(Count of Data Having Unknown Label Values)+ (Count of Data Having Known Label Values)}, Vertical Axis: (Count of Positive Instances within Data Having Known Label Values)/(Total Count of Positive Instances).

When a random prediction is made, the hit rate appears to be a diagonal which connects the origin with (1, 1). Also, limits appear to be a line which connects the origin with ([Count of Positive Instances]/[(Count of Data Having Unknown Label Values )+(Count of Data Having Known Label value)]), 1).

The transition in correct answer rate is defined in the following manner:

Horizontal Axis: Count of Data Having Known Label Values.

Vertical Axis: (Count of Correctly Determined Data)/ (Count of Data Having Known Label Values).

In "Best Mode for Carrying out the Invention" later described, an active learning system according to the present invention is evaluated using these indexes (see FIGS. 3A to 3C, 5, 7, 9, 11, 13A, 13B, 15A, 15B, and 18).

Entropy is defined in the following manner. Assume that each $P\_i$ indicates the probability of being i.

$$\text{Entropy} = -(p\_1 * \log(P\_1) + p\_2 * \log(P\_2) + \ldots + P\_n * \log(P\_n))$$

A conventional active learning system is disclosed in JP-A-11-316754 [2]. The active learning system disclosed in this gazette is characterized by performing, for improving a learning accuracy, a learning step for forcing a lower-level algorithm to perform learning, a boosting step for improving the learning accuracy through boosting, a step for predicting function values for a plurality of candidate input points, and an input point specifying step for selecting an input point which presents the smallest difference between a weighted sum of output values with the largest sum total of weights and a weighted sum of output values with the next largest sum total of weights.

Abe et al. [1] further disclose an approach using a system which comprises a plurality of learning machines, where each learning machine randomly samples data to learn the data, and the respective learning machines perform a prediction for data having unknown label values to deliver a point at which a variance is maximized as a point which should be next learned.

DISCLOSURE OF THE INVENTION

Problems to Be Solved by the Invention

However, the conventional approaches described above have a problem that data to be delivered as being next learned cannot be controlled by the user's intention. This is because these conventional approaches only select a next candidate point which is a point at which the variance is maximized, or a point at which an output from a lower learning machine can be divided, with the intention to improve the learning accuracy as early as possible.

The conventional approaches also have a problem of difficulties in deriving a correct answer rate for a target value or class in a situation where the target value or class has an extremely small count of data as compared with that of other classes or values. This is not only because lower-level learning algorithms so far developed have not been designed in consideration of a situation in which the counts are extremely unequal, but also because the conventional active learning algorithms have not either assume such a situation as well.

Active learning algorithms used by the conventional approaches have a problem that a large count of similar data are delivered as input points at a stage of selecting data to be entered. This is also because the conventional active learning algorithms do not have a mechanism which can fully utilize those learned by lower-level learning algorithms.

These conventional approaches further have a problem of inability to transition the learning accuracy because a final determination method has previously been determined in a system.

It is therefore an object of the present invention to provide an active learning method which is capable of controlling the accuracy with the user's intention, while improving the accuracy of the active learning method, and also comprises a function of preferentially extracting data of interest, and the like.

It is therefore another object of the present invention to provide an active learning system which is capable of controlling the accuracy with the user's intention, while improving the accuracy of the active learning method, and also comprises a function of preferentially extracting data of interest, and the like.

Means for Solving the Problems

The object of the present invention is achieved by an active learning method using a storage device for storing a set of known data and a set of unknown data, and a plurality of learning machines, wherein the known data are data having known label values, and the unknown data are data having unknown label values. The method comprises the steps of the plurality of learning machines sampling the known data from the storage device independently of one another, and thereafter learning the known data, integrating and delivering the output results of the plurality of learning machines as a result of the learning, the plurality of learning machines retrieving unknown data from the storage device for prediction, calculating and delivering data to be next learned based on the result of the prediction, entering a label value corresponding to the data to be next learned, and deleting the data, the label value of which has been entered, from the set of unknown data, and adding the data to the set of known data, wherein non-uniform weighting is performed at least one of: when the known data is sampled; when the results of the learning by the plurality of learning machines are integrated; and when the data to be next learned is calculated from the predictions by the plurality of learning machines.

In the weighting in the active learning method according to the present invention, the weight is increased, for example, when an extreme deviation is present in the count of data. Further, in this method, with the addition of a mechanism for expanding a data distribution by again selecting from selected candidate data in consideration of a spatial data distribution, upon selection of data which should be next entered to the learning devices for prediction, it is possible to avoid to deliver data which is similar to one another.

The other object of the present invention is achieved by an active learning system which includes: a storage device for storing a set of known data and a set of unknown data, wherein the known data are data having known label values; and the unknown data are data having unknown label values; a plurality of learning machines for learning the known data and predicting the unknown data; a plurality of sampling devices provided for each of the learning machines for sampling the known data from the storage device and supplying the sampled data to the learning machines corresponding thereto; first integrating means for integrating results of learning performed by the respective learning machines based on the known data; second integrating means for calculating data to be next learned from results of the predictions performed by the respective learning machines based on the unknown data, and delivering the data to be next learned; result input means for entering a label value corresponding to the data to be next learned; and control means for deleting the data, the label value of which has been entered, from the set of unknown data, and adding the data to the set of known data, and also has at least one of: (1) sampling weighting means for setting a weight at the time of sampling for each of the sampling devices; (2) prediction weighting means for setting weights for use by the first integrating means to integrate the results of learning; (3) data weighting means for setting weights for use by the second integrating means to select data to be next learned; and (4) group generating means for performing grouping of the known data and the unknown data.

In the weighting in the active learning system according to the present invention, when an extreme deviation is present in the count of data, for example, a heavier weight is applied to.

The present invention employs at least one of three types of weighting: (1) weighting data when learned data is sampled; (2) weighting data when an input point is selected from candidate input points; and (3) weighting entered data when a prediction is made for the data. In this way, according to the present invention, data of interest can be preponderantly learned by increasing a weight for the data, so that the data of interest can be improved in covering rate, while improving the accuracy of mining, in a situation where the data of interest has an extremely low percentage to the entirety. Also, by reducing the weight for the data of interest, the learning can be performed in a region in which data of interest has not been found, thus making it possible to discover, at an early stage, the data of interest when it is based on a variety of characteristics.

The conventional active learning method uniformly handles learning results when data is predicted, whereas the learning results can be weighted, according to present invention, so that the accuracy can be controlled by changing weights and therefore learning can be performed with an arbitrary accuracy. In the conventional method, data to be next learned tend to spatially concentrate in a certain region, whereas the present invention provides a mechanism for spatially dispersing these data, thus making it possible to correct disadvantages of the conventional active learning method and increase a correct answer rate over the conventional one.

BEST MODE FOR CARRYING OUT THE INVENTION

An active learning system according to the present invention is intended to achieve the aforementioned objects of the present invention by employing at least one of a total of three types of weighting: (1) weighting data when the learned data is sampled; (2) weighting data when an input point is selected from candidate input points; and (3) weighting data when a prediction is made for entered data. In these types of weighting, when an extreme deviation occurs in the count of data, the weighting is performed to apply a heavier weight therefor. A variety of embodiments are contemplated in the present invention depending on at which stage the weighting is performed.

Also, in the present invention, by adding a mechanism for expanding a data distribution, involving a second selection from selected candidate data in consideration of a spatial data distribution, upon selection of data to be next learned, it is possible to avoid to deliver data which is similar to one another. A variety of embodiments can also be contemplated in the present invention depending on the presence or absence of such a mechanism.

In the following, a description will be given of a variety of such embodiments.

FIRST EMBODIMENT

Figure 1:
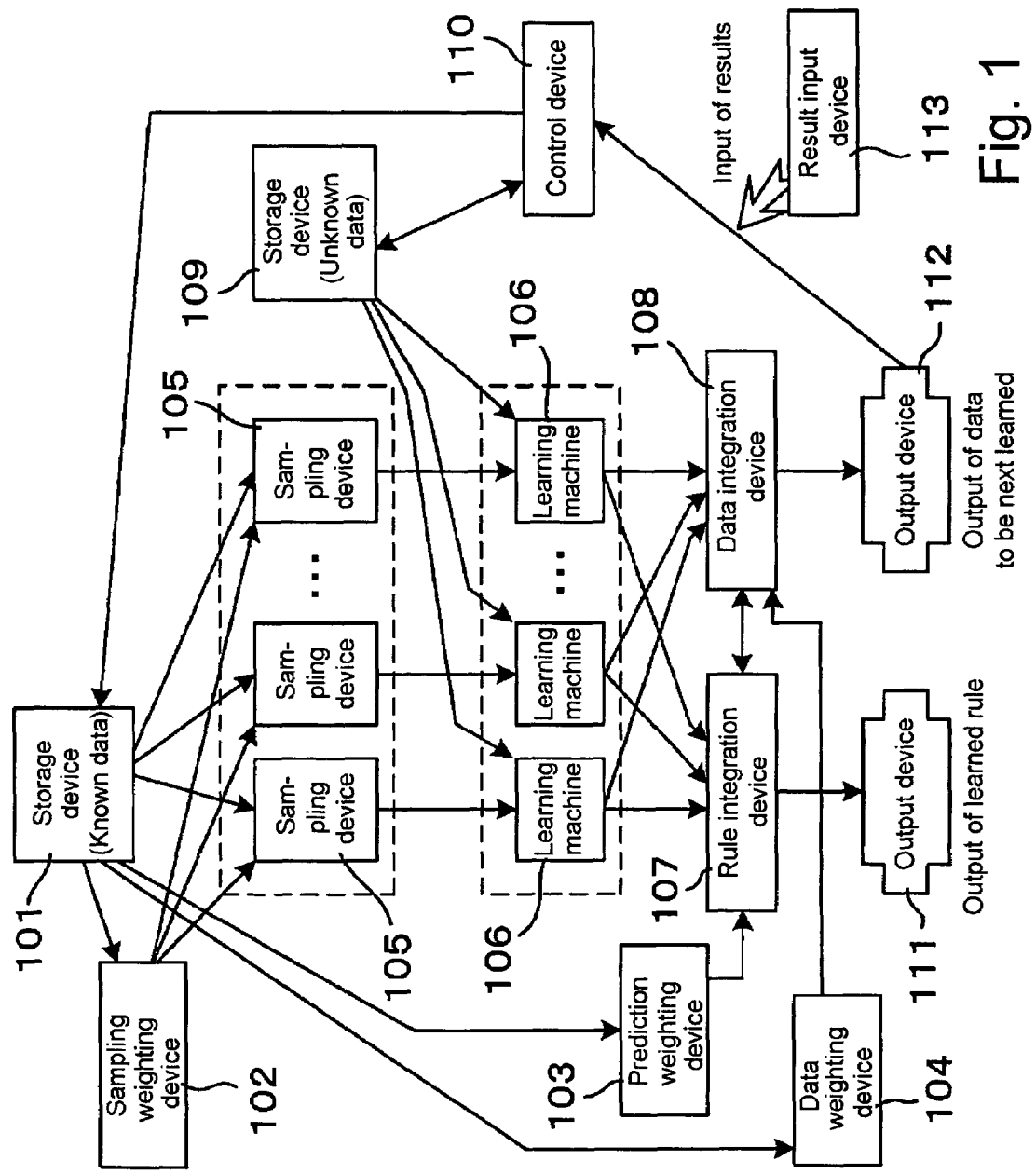
FIG. 1 is a block diagram illustrating the configuration of an active learning system according to a first embodiment of the present invention.

An active learning system according to a first embodiment of the present invention illustrated in FIG. 1 comprises storage device 101 for storing data having known label values (i.e., known data); sampling weighting device 102 for generating data for weighting known data within storage device 101 when they are sampled; prediction weighting device 103 for generating data for performing weighting when a prediction is made; data weighting device 104 for generating data for performing weighting when data to be next learned is selected; a plurality of learning machines 106; a plurality of sampling devices 105 for sampling data from storage device 101 to supply the data to corresponding learning machines 106; rule integration device 107 for integrating the results of learning from the plurality of learning machines 106; output device 111 connected to rule integration device 107; data integration device 108 for calculating data to be next learned based on the results in the plurality of learning machine 106; output device 112 connected to data integration device 108;

result input device 113 for entering a result for the output result of the data to be next learned; storage device 109 for storing data having unknown label values (i.e., unknown data); and control device 110 for controlling the overall active learning system.

Control device 110 conducts control of summarizing results entered by result input device 113, for example, in a table format, deleting pertinent data in storage device 109, and instead storing data to which the results have been added to storage device 101. Sampling devices 105 and learning machines 106 are provided herein in a one-to-one relationship. Also, each learning machine 106 is supplied with data from corresponding sampling device 105, and is supplied with unknown data from storage device 109. A learned rule is delivered from output device 111 connected to rule integration device 107, while data to be next learned is delivered from output device 112 connected to data integration device 108.

Sampling weighting device 102 generates weighting data for weighting data upon sampling based on known data stored in storage device 101, and supplies the weighting data to each sampling device 105. Prediction weighting device 103 generates weighting data for performing weighting based on known data stored in storage device 101 when the results of learning for respective learning machines 106 are summarized in rule integration device 107, and supplies the generated weighting data to rule integration device 107. Likewise, data weighting device 104 generates weighting data for performing weighting based on the known data stored in storage device 101 when data to be next learned is selected and delivered in data integration device 108, and supplies the generated weighting data to data integration device 108.

Here, a description will be given of the weighting performed by sampling weighting device 102, prediction weighting device 103, and data weighting device 104, respectively. The weighting for use by these weighting devices 102 to 104 can be of various types as long as it is non-uniform weighting.

The weighting in sampling weighting device 102 may involve, for example, (1) setting weights in accordance with classes or values in the known data; (2) setting weights such that each sampling devices 105 randomly samples data in a certain class and data in the remaining classes independently when a label value takes a discrete value; (3) setting weights such that each sampling device 105 randomly samples all data near a particular label value and data of the remaining label values when the label value takes a continuous value; and the like.

The weighting in prediction weighting device 103 may involve, for example, a method of determining a weight for each class (when a label value takes a discrete value) or for each section in values (when a label value takes a continuous value) for a result delivered by each learning machine 106.

The weighting in data weighting device 104 involves, for example, (1) assigning weights in accordance with the degree of variations calculated from the frequency on a class-by-class basis when a label value takes a discrete value; (2) assigning weights in accordance with a variance of a value derived as a result in each learning machine 106; (3) assigning weights in accordance with the entropy calculated from the frequency on a class-by-class basis when a label value takes a discrete value; and the like. When weights are assigned in accordance with the degree of variations, a maximum weight may be omitted if it is assigned only to a maximum degree of variations. Likewise, when weights are assigned in accordance with the variance or entropy, a maximum weight may be omitted if it is assigned only to maximum variance or entropy. Further, a weight may be assigned to the result itself derived in each learning machine 106, separately from these weights.

Figure 2:
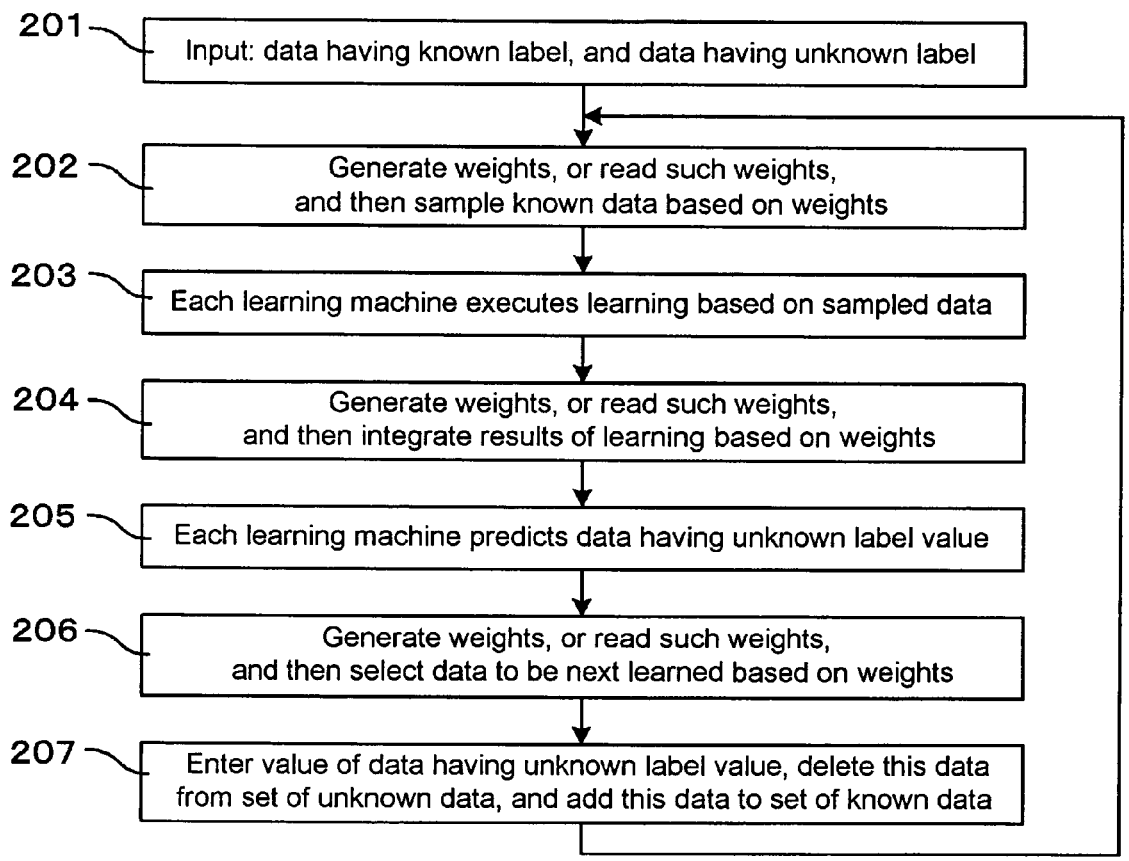
FIG. 2 is a flow chart illustrating a process of an active learning method using the system illustrated in FIG. 1.

Next, the operation of the active learning system of the present embodiment will be described with reference to a flow chart illustrated in FIG. 2. Assume herein that data is given in a table format.

First, at step 201, data having known label values are stored in storage device 101, while data having unknown label values are stored in storage device 109. As a result, a set of known data is stored in storage device 101, while a set of unknown data is stored in storage device 109.

Next, at step 202, sampling weighting device 102 generates weights (i.e., weighting data) based on data sent from storage device 102, or reads such weights, and sends the weights to respective sampling device 105. Each sampling device 105 samples the known data in storage device 101 while weighting the data in accordance with the weight sent from sampling weighting device 102, and sends the sampled data to corresponding learning machine 106. Each learning machine 106 executes the learning based on the data sent from the sampling device, at step 203.

From storage device 101, data is also sent to prediction weighting device 103, and prediction weighting device 103 generates weights (i.e., weighing data) based on the data sent from storage device 101, or reads such weights, and sends them to rule integration device 107 at step 204. Rule integration device 107 summarizes learning results while weighting these learning results from respective learning machines 106 based on the weighting data. In this event, rule integration device 107 calculates a frequency for each class (when a label value takes a discrete value) or for each section in values (when a label value takes a continuous value) for the result delivered by each learning machine 106, multiplies the frequencies by the aforementioned weights, and delivers the one having the largest value as a predicted value. Rule integration device 107 sends the result of summarizing the learning results to output device 111 as a rule.

Next, at step 205, each learning machine 106 makes a prediction for data having an unknown label value stored in storage device 109, and sends the result to data integration device 108. In this event, data is also sent from storage device 101 to data weighting device 104, and data weighting device 104 generates weights (i.e., weighting data) based on the data sent from storage device 101, or reads such weights, and sends them to data integration device 108 at step 206. Data integration device 108 integrates the predicted results from respective learning machines 106, while weighting these predicted results based on the weighting data, and selects data to be next learned. A method of selecting data to be next learned may include the followings: For example, (1) when the weights are assigned in accordance with the degree of variations or entropy, a frequency is calculated for each of the classes from the result delivered from each learning machine 106, a value indicative of the degree of variations or entropy is calculated based on the frequency, and data are selected in an order in which the data are assigned heavier weights in accordance with the degree of variations or entropy; (2) when the weights are assigned in accordance with the variance, the variance is calculated from the result delivered by each learning machine 106, and data are selected in an order in which the data are assigned heavier weights in accordance with the variance; (3) when the weights are assigned in accordance with the degree of variations or the entropy and the result, respectively, the frequency is calculated for each of the classes from the result delivered by each learning machine 106, a value indicative of the degree of variations or entropy is calculated based on the frequency, and data are selected in an order in which the data are assigned heavier weights assigned in accordance with the degree of variations or entropy in combination with heavier weights assigned to the results; (4) when the weights are assigned in accordance with the variance and result, respectively, the variance is calculated from the result delivered by each learning machine 106, and data are selected in an order in which the data are assigned heavier weights assigned in accordance with the variance in combination with heavier weights assigned to the result. Data integration device 108 sends the result to output device 112 as data which should be next learned.

Next, at step 207, a result (label value) for the data to be next learned is entered manually or by a computer through result input device 113. The entered result is sent to control device 110, and control device 110 deletes the data, the result of which has been entered, from storage device 109, and instead stores the data in storage device 101.

Subsequently, the foregoing process is repeated to advance the active learning. In this event, while the process is performed until unknown data is exhausted in storage device 109 in the longest case, but may be aborted before that. As will be later described, according to the present embodiment, since a "good result" can be rapidly provided, a proper number of repetitions, for example, may be set such that the process is aborted at that time. Any of sampling weighting device 102, prediction weighting device 103, and data weighting device 104 performs non-uniform weighting.

Figure 3A:
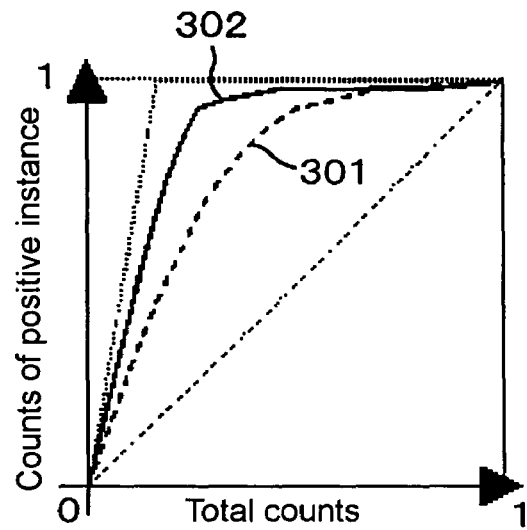
FIG. 3A is a graph showing hit rates for comparing the learning accuracy between the active learning method according to the system illustrated in FIG. 1 and a conventional active learning method.
Figure 3B:
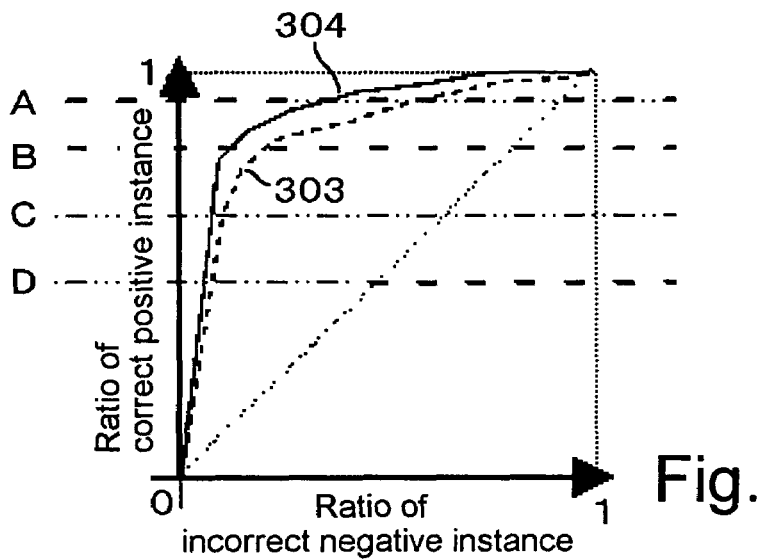
FIG. 3B is a graph showing ROC curves for comparing the learning accuracy between the active learning method according to the system illustrated in FIG. 1 and the conventional active learning method.
Figure 3C:
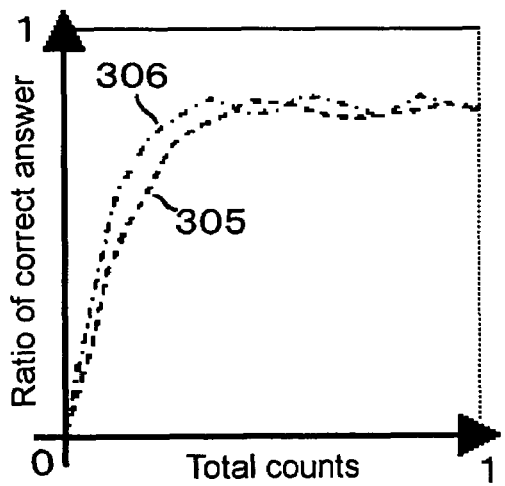
FIG. 3C is a graph showing transitions in correct answer rate for comparing the learning accuracy between the active learning method according to the system illustrated in FIG. 1 and the conventional active learning method.

FIGS. 3A to 3C describe advantageous effects of the active learning system of the first embodiment.

In FIG. 3A, broken line 301 indicates a hit rate when a conventional active learning method is used, and solid line 302 indicates a hit rate when the active learning system of the present embodiment is used. According to the present embodiment, it can be seen that data on a class (value) of interest has been found at an earlier stage than the conventional active learning method.

In FIG. 3B, broken line 303 indicates an ROC curve when the conventional active learning method is used, and solid line 304 indicates an ROC curve when the active learning system of the present embodiment is used. According to the present embodiment, it can be seen that the learning can be performed with a higher accuracy as compared with the conventional active learning method. Further, in the conventional active learning method, since the accuracy exists at a certain point on the curve, it is impossible to control how the accuracy is made from the outside. On the other hand, the approach of the present embodiment can set an arbitrary accuracy by changing weights in prediction weighting device 103. While FIG. 3B includes four straight lines labeled by A to D, the present embodiment can set an arbitrary accuracy because a straight line can be set at an arbitrary position.

In FIG. 3C, broken line 305 indicates a transition in correct answer rate when the conventional active learning method is used, and broken line 306 indicates a transition in correct answer rate when the active learning system of the present embodiment is used. According to the present embodiment, it can be seen that the correct answer rate can be improved for a class (value) of interest by increasing a weight for data of the class.

SECOND EMBODIMENT

Figure 4:
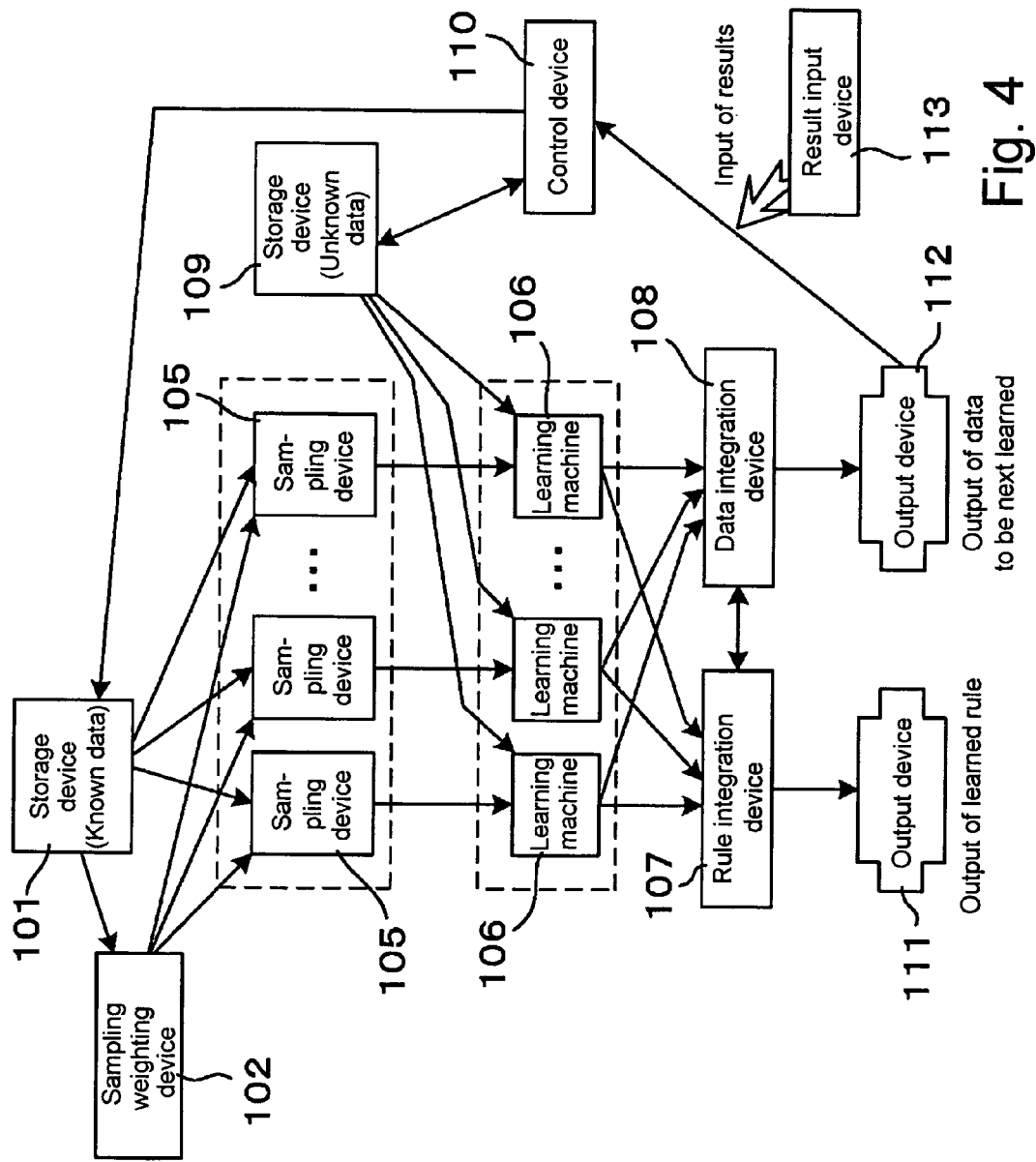
FIG. 4 is a block diagram illustrating the configuration of an active learning system according to a second embodiment of the present invention.

Next, a second embodiment of the present invention will be described with reference to FIG. 4. An active learning system illustrated in FIG. 4 is similar to the active learning system of the first embodiment, but differs from that of the first embodiment in that it is not provided with the prediction weighting device and data weighting device. With the omission of the prediction weighting device and data weighting device, rule integration device 107 uniformly handles results delivered from learning machines 106, so that a final rule is delivered by such means as a decision by majority. Specifically, rule integration device 107 calculates a frequency on a class-by-class basis, when a label value takes a discrete value, or on a section-by-section basis, when a label value takes a continuous value, for the result delivered from each learning machine 106, and delivers the one having the largest value as a predicted value.

Also, data integration device 108 uniformly handles the output results as well, and delivers the data which is most difficult to determine. Specifically, for example, (1) when the label value takes a discrete value, the frequency is calculated on a class-by-class basis from the result delivered by each learning machine 106, a value indicative of the degree of variations is calculated based on the frequencies, and data to be next learned is selected from data determined to belong to a certain class and data which has a maximum or substantially maximum index indicative of the degree of variations. (2) When the label value takes a continuous value, the variance is calculated from the result delivered by each learning machine 106, and data to be next learned is selected from data near a certain value and data, the variance of which is maximum or substantially maximum. (3) The variance is calculated from the result delivered from each learning machine 106, and data to be next learned is selected from data which do not belong to a particular class (or data not near a certain value), and "the variance of which is minimum or substantially minimum."

Figure 5:
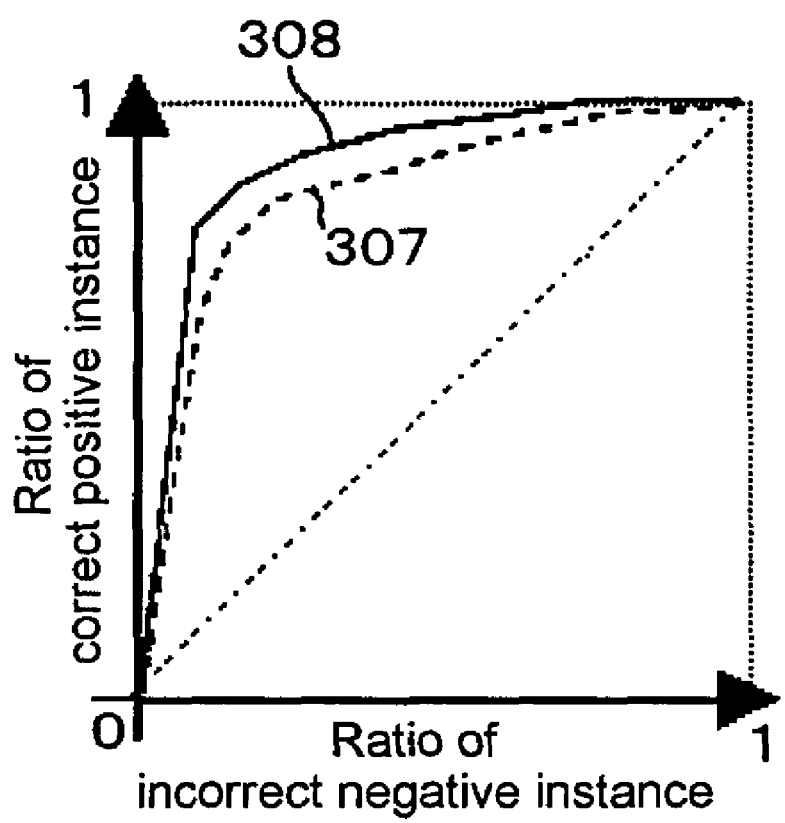
FIG. 5 is a graph showing ROC curves for comparing the learning accuracy between the active learning method according to the system illustrated in FIG. 4 and the conventional active learning method.

FIG. 5 illustrates advantageous effects of the active learning system of the second embodiment. In the figure, broken line 307 is an ROC curve representative of a learning accuracy when a conventional active learning method is used, and solid line 308 is an ROC curve indicative of a learning accuracy when the active learning system of this embodiment performs such sampling that more data are selected from a class (value) of interest. According to the present embodiment, it can be seen that a higher accuracy can be achieved than the conventional active learning method.

THIRD EMBODIMENT

Figure 6:
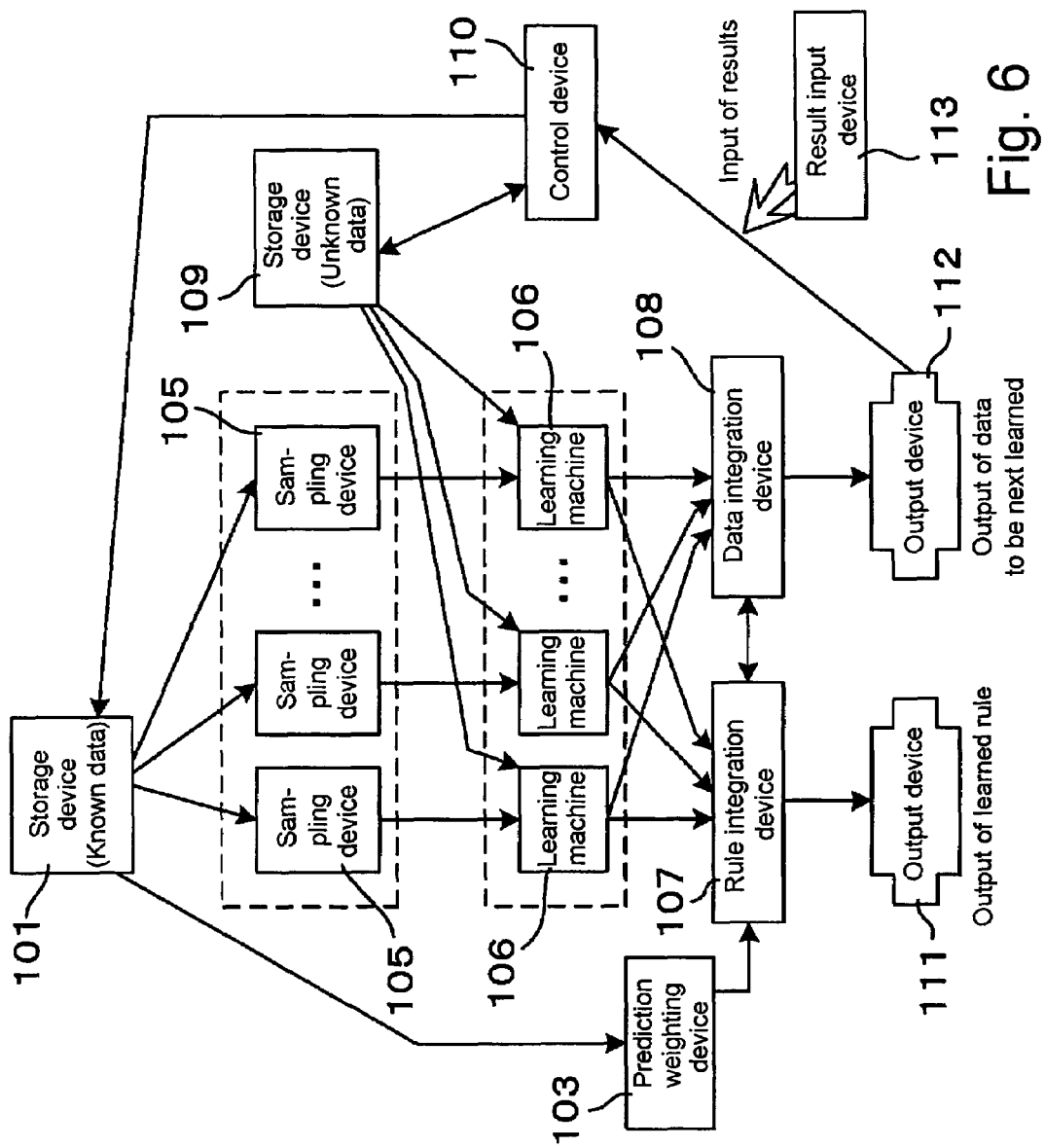
FIG. 6 is a block diagram illustrating the configuration of an active learning system according to a third embodiment of the present invention.

Next, a third embodiment of the present invention will be described with reference to FIG. 6. An active learning system illustrated in FIG. 6 is similar to the active learning system of the first embodiment, but differs from that of the first embodiment in that it is not provided with the sampling weighting device and data weighting device. With the omission of the sampling weighting device and data weighting device, each sampling device 105 uniformly handles all known data, and performs random sampling. Also, data integration device 108 uniformly handles the output results, and delivers the data which is most difficult to determine, as is the case with the second embodiment.

Figure 7:
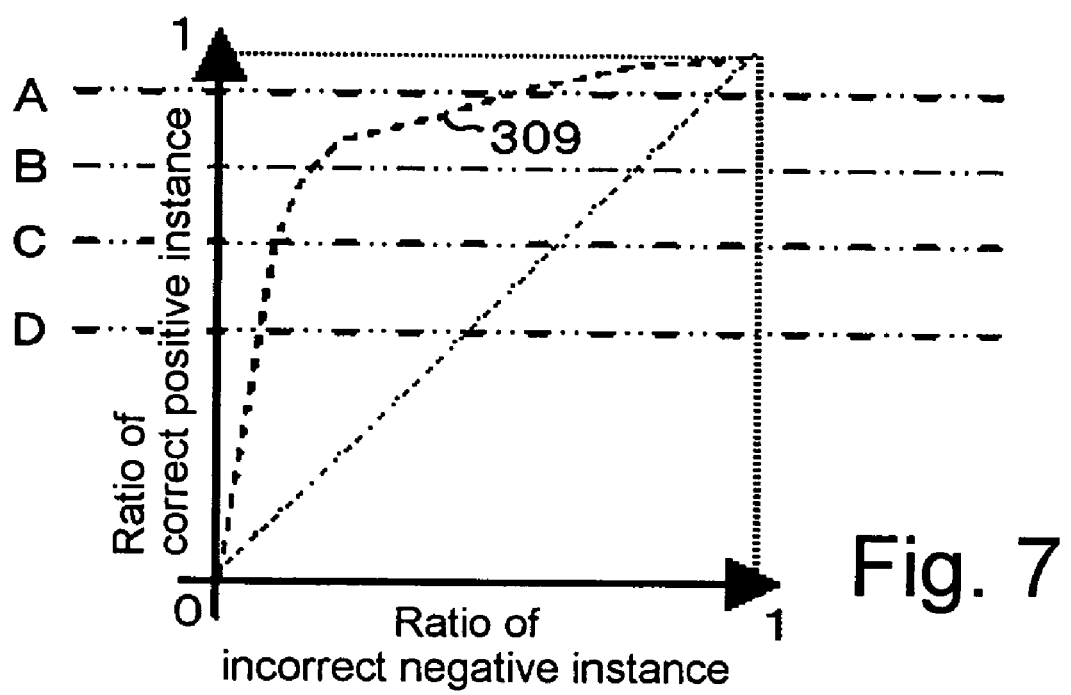
FIG. 7 is a graph showing ROC curves for comparing the learning accuracy between the active learning method according to the system illustrated in FIG. 6 and the conventional active learning method.

FIG. 7 illustrates advantageous effects of the active learning system of the third embodiment. In the figure, line 309 indicates an ROC curve which represents a learning accuracy of this active learning system. Since the conventional active learning method uniformly handles learning results when the results are integrated, an active learning system can be built only with a certain particular accuracy. According to this embodiment, since learning results can be integrated with arbitrary weights, a system can be configured, for example, with accuracies labeled A, B, C, D in the figure.

FOURTH EMBODIMENT

Figure 8:
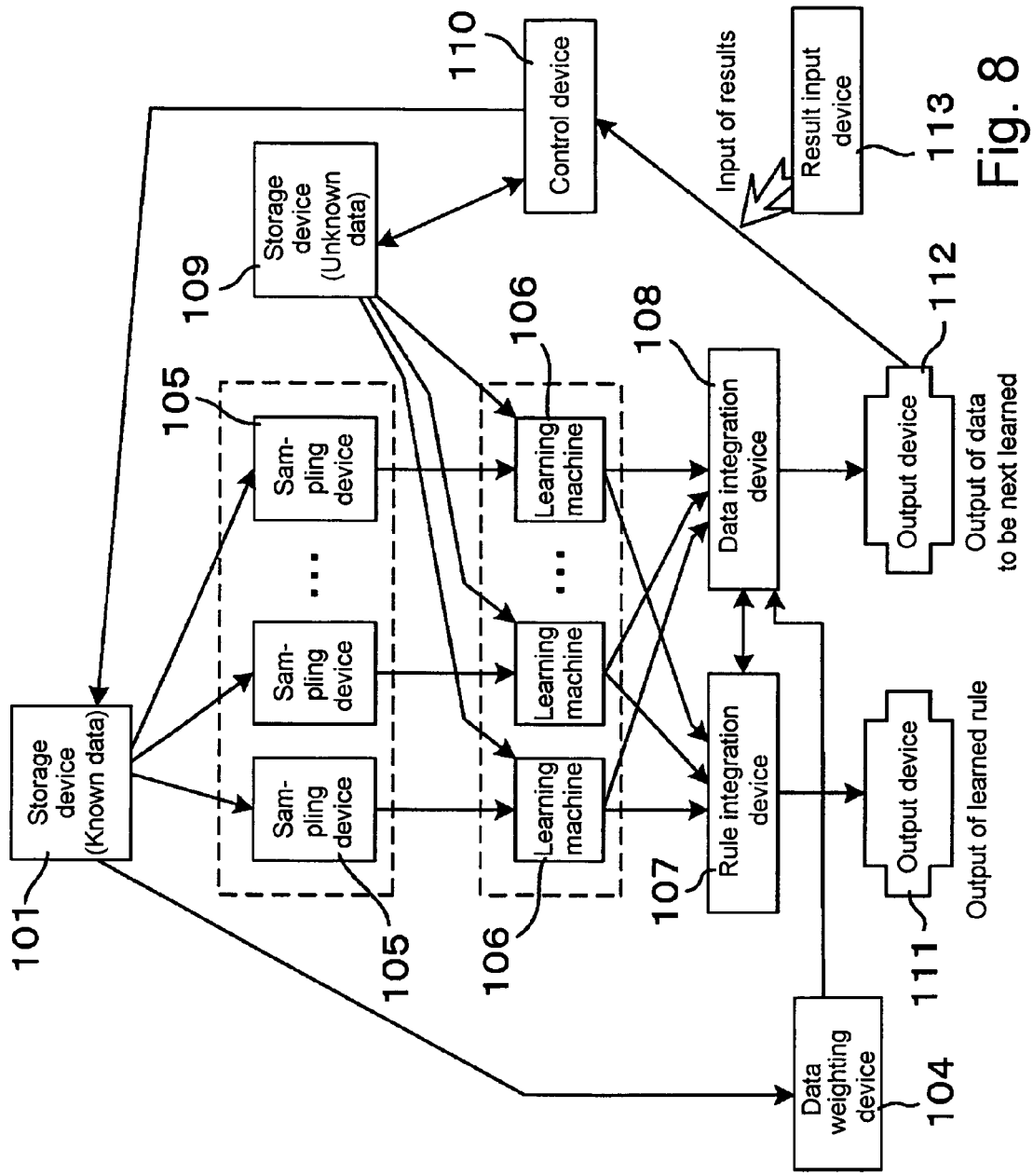
FIG. 8 is a block diagram illustrating the configuration of an active learning system according to a fourth embodiment of the present invention.

Next, a fourth embodiment of the present invention will be described with reference to FIG. 8. An active learning system illustrated in FIG. 8 is similar to the active learning system of the first embodiment, but differs from that of the first embodiment in that it is not provided with the sampling weighting device and prediction weighting device. With the omission of the sampling weighting device and prediction weighting device, each sampling device 105 uniformly handles all known data, and performs random sampling. Also, rule integration device 107 uniformly handles results delivered from learning machines 106, so that a final rule is delivered by such means as a decision by majority, as is the case with the second embodiment.

Figure 9:
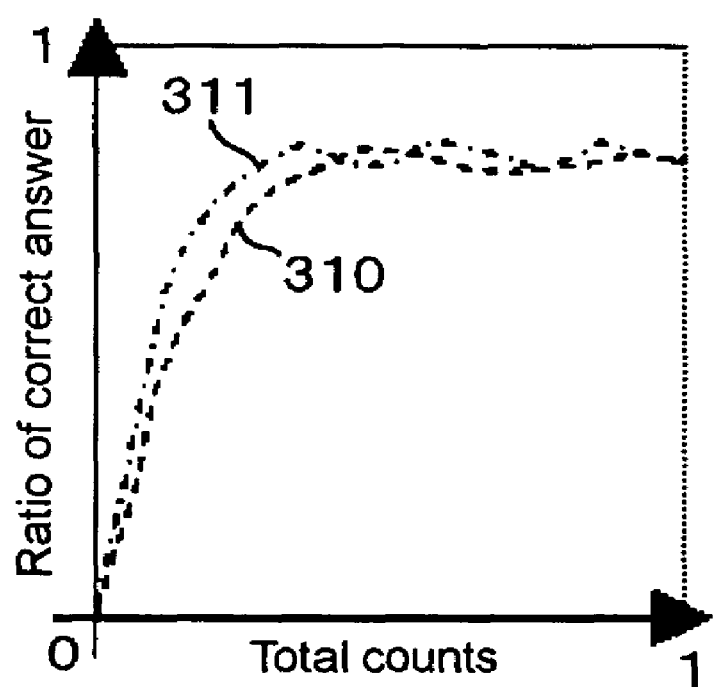
FIG. 9 is a graph showing transitions in correct answer rate for comparing the learning accuracy between the active learning method according to the system illustrated in FIG. 8 and a the conventional active learning method.

FIG. 9 illustrates advantageous effects of the active learning system of the fourth embodiment. In the figure, broken line 310 indicates a transition in correct answer rate when a conventional active learning method is used, and broken line 311 indicates a transition in correct answer rate when the active learning system of the present embodiment is used. In the present embodiment, weights at the time of sampling are such that the weighting is performed to disperse, as much as possible, data to be next experimented. With the use of such weighting, it is understood that the learning is performed earlier than the conventional active learning method.

FIFTH EMBODIMENT

Figure 10:
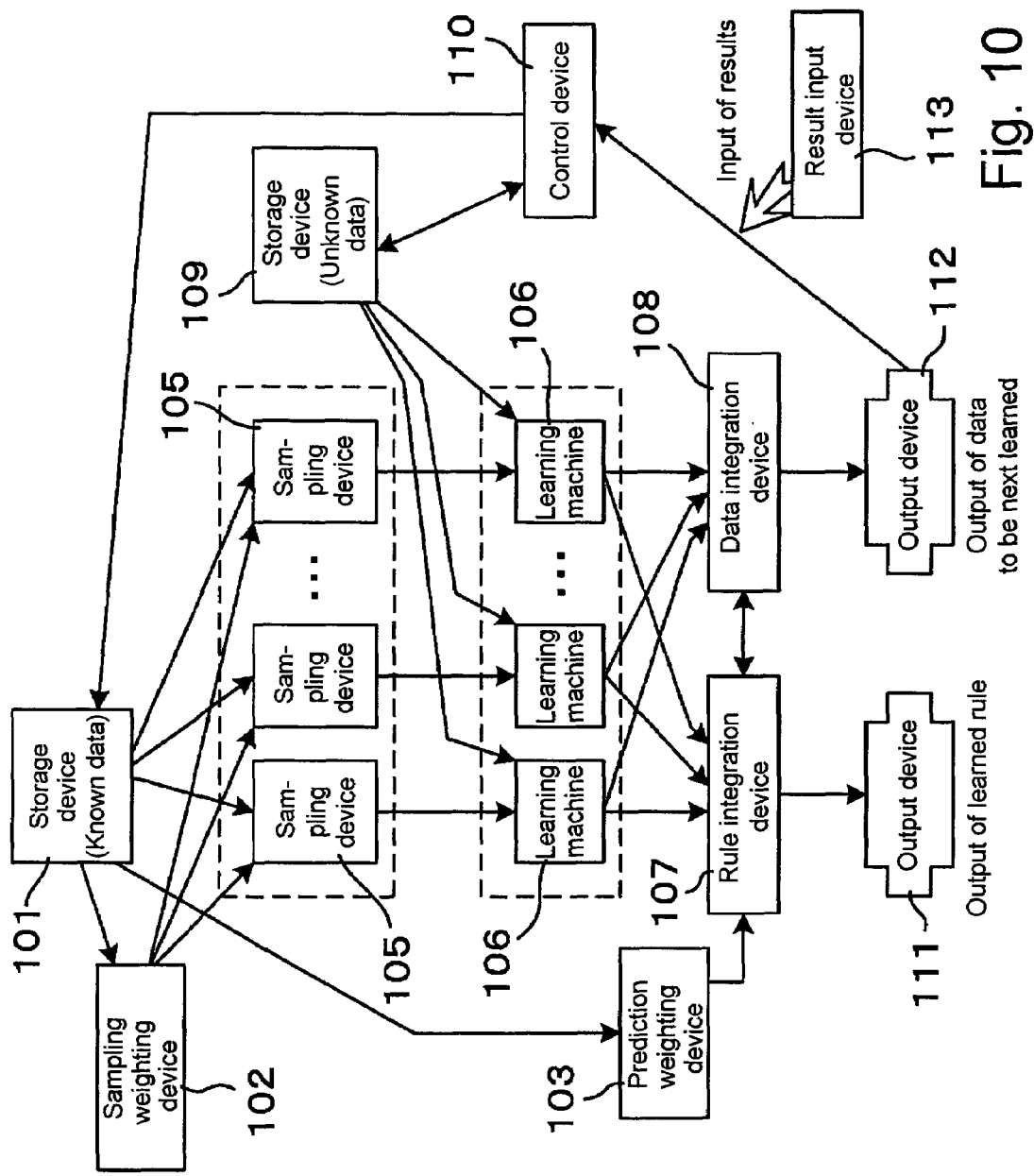
FIG. 10 is a block diagram illustrating the configuration of an active learning system according to a fifth embodiment of the present invention.

Next, a fifth embodiment of the present invention will be described with reference to FIG. 10. An active learning system illustrated in FIG. 10 is similar to the active learning system of the first embodiment, but differs from that of the first embodiment in that it is not provided with the data weighting device. With the omission of the data weighting device, data integration device 108 uniformly handles output results, and delivers the data which is most difficult to determine, as is the case with the second embodiment.

Figure 11:
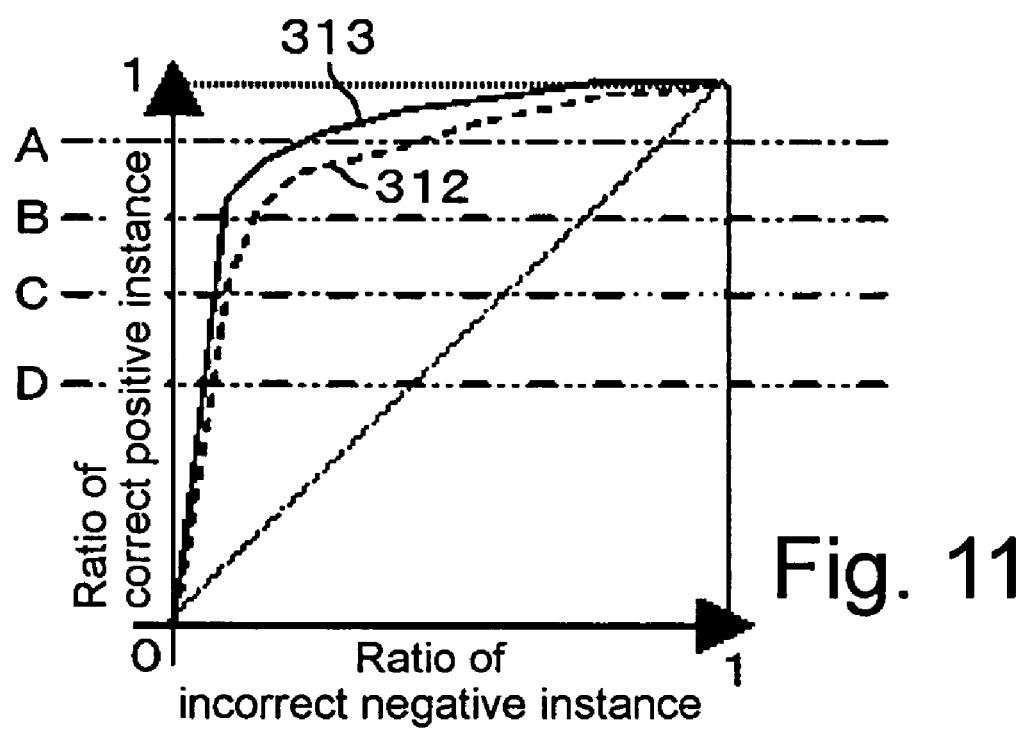
FIG. 11 is a graph showing ROC curves for comparing the learning accuracy between the active learning method according to the system illustrated in FIG. 10 and the conventional active learning method.

FIG. 11 illustrates advantageous effects of the active learning system of the fifth embodiment. In the figure, broken line 312 indicates an ROC curve when a conventional active learning method is used, and broken line 313 indicates an ROC curve when the active learning system of the present embodiment is used. In the present embodiment, the weighting is performed at the time of sampling such that a heavier weight is applied to a certain class (value), and the weighting is performed upon selection of data to be next learned such that a heavier weight is applied to the class in a similar manner. As can be seen from FIG. 11, according to the present embodiment, the learning accuracy is improved, and the learning can be performed with an arbitrary accuracy, as indicated by A, B, C, D, by changing the weights in the prediction weighting device.

SIXTH EMBODIMENT

Figure 12:
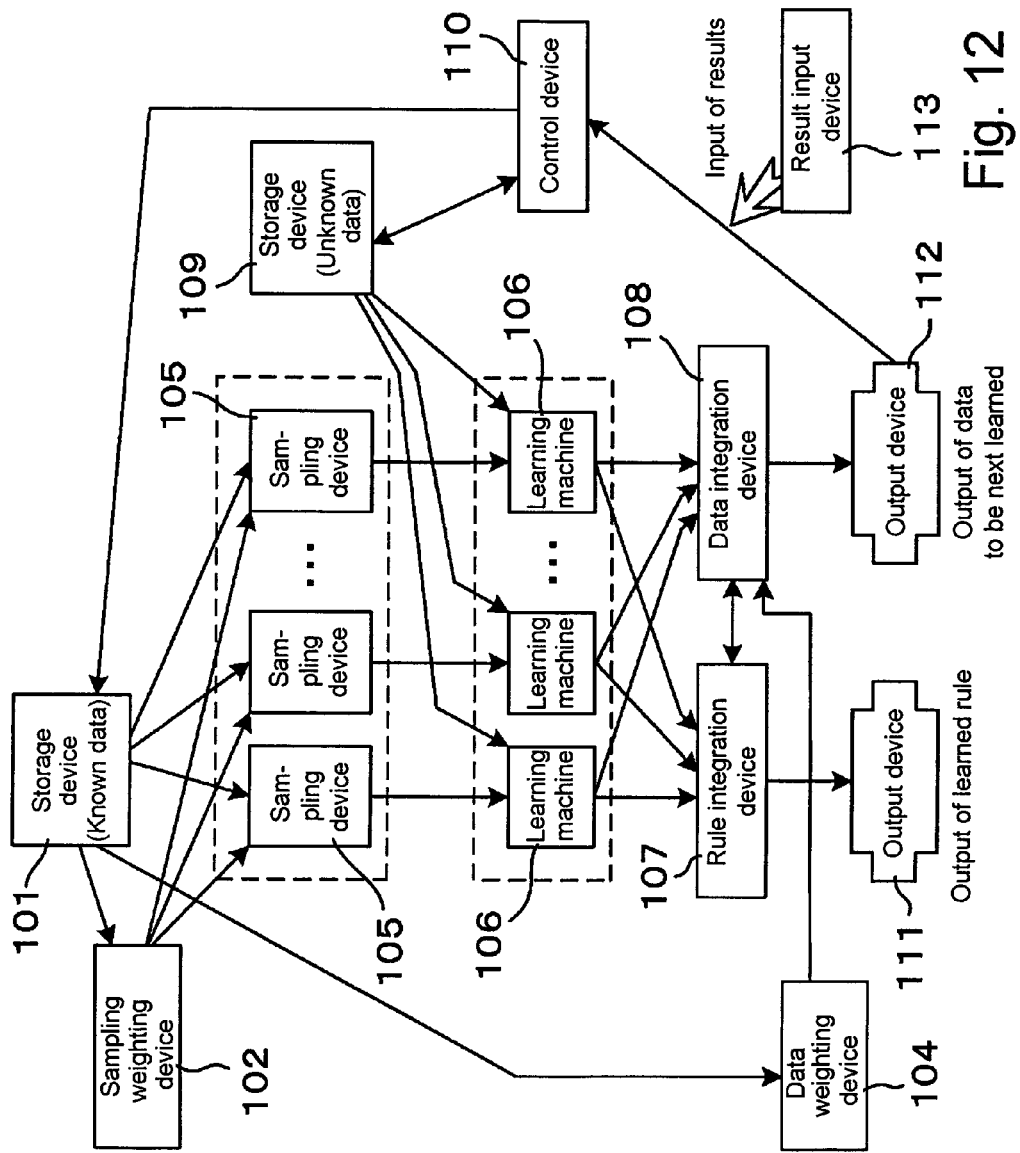
FIG. 12 is a block diagram illustrating the configuration of an active learning system according to a sixth embodiment of the present invention.

Next, a sixth embodiment of the present invention will be described with reference to FIG. 12. An active learning system illustrated in FIG. 12 is similar to the active learning system of the first embodiment, but differs from that of the first embodiment in that it is not provided with the prediction weighting device. With the omission of the prediction weighting device, rule integration device 107 uniformly handles results delivered from learning machines 106, so that a final rule is delivered by such means as a decision by majority, as is the case with the second embodiment.

Figure 13A:
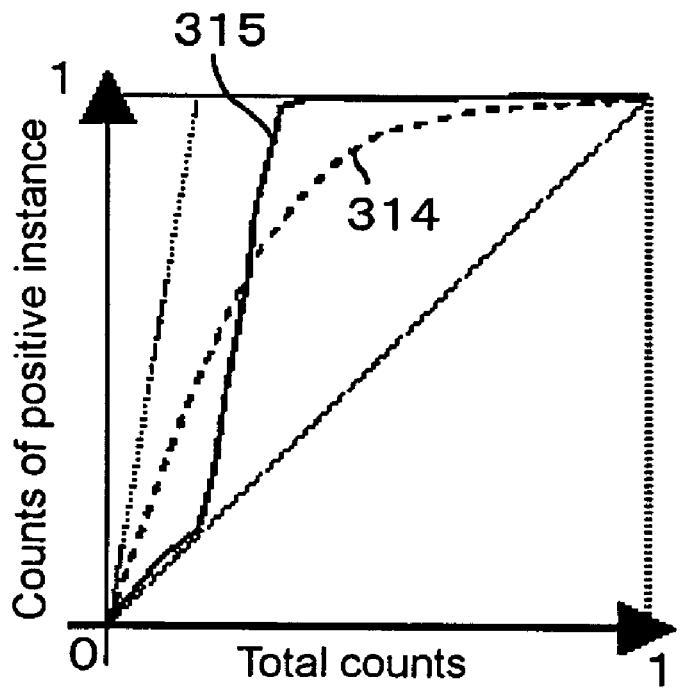
FIG. 13A is a graph showing hit rates for comparing the learning accuracy between the active learning method according to the system illustrated in FIG. 11 and the conventional active learning method.
Figure 13B:
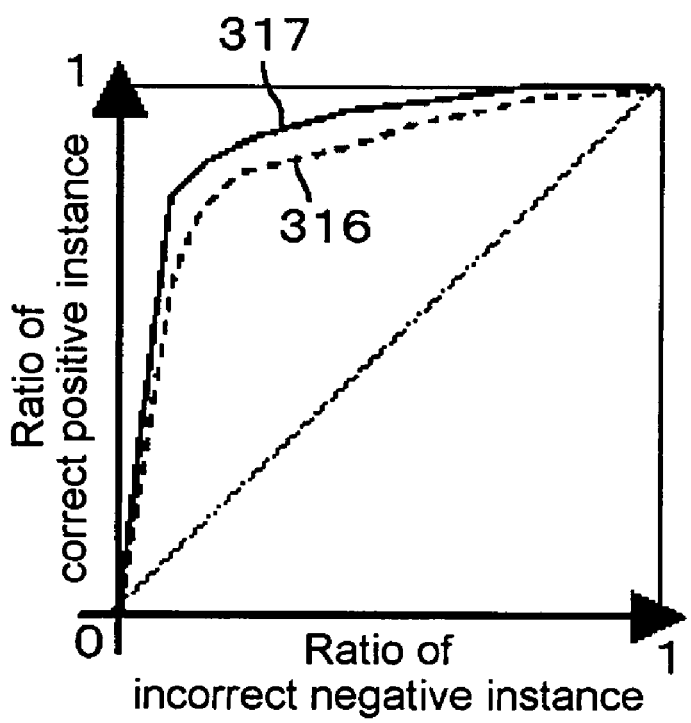
FIG. 13B is a graph showing ROC curves for comparing the learning accuracy between the active learning method according to the system illustrated in FIG. 12 and the conventional active learning method.

FIGS. 13A, 13B illustrate advantageous effects of the active learning system of the sixth embodiment. In FIG. 13A, broken line 314 indicates a hit rate when a conventional active learning method is used, and solid line 315 indicates a hit rate when the active learning system of the present embodiment is used. In FIG. 13B, broken line 316 indicates an ROC curve when the conventional active learning method is used, and solid line 317 indicates an ROC curve when the active learning system of the present embodiment is used. In the present embodiment, the weighting is performed at the time of sampling such that a heavier weight is applied to a certain class (value), and the weighting is performed upon selection of data to be next learned such that a heavier weight is applied to the class in a similar manner. According to the present embodiment, it is understood that 90 % of classes (values) of interest can be found earlier than the conventional one, and that the learning accuracy is also improved.

SEVENTH EMBODIMENT

Figure 14:
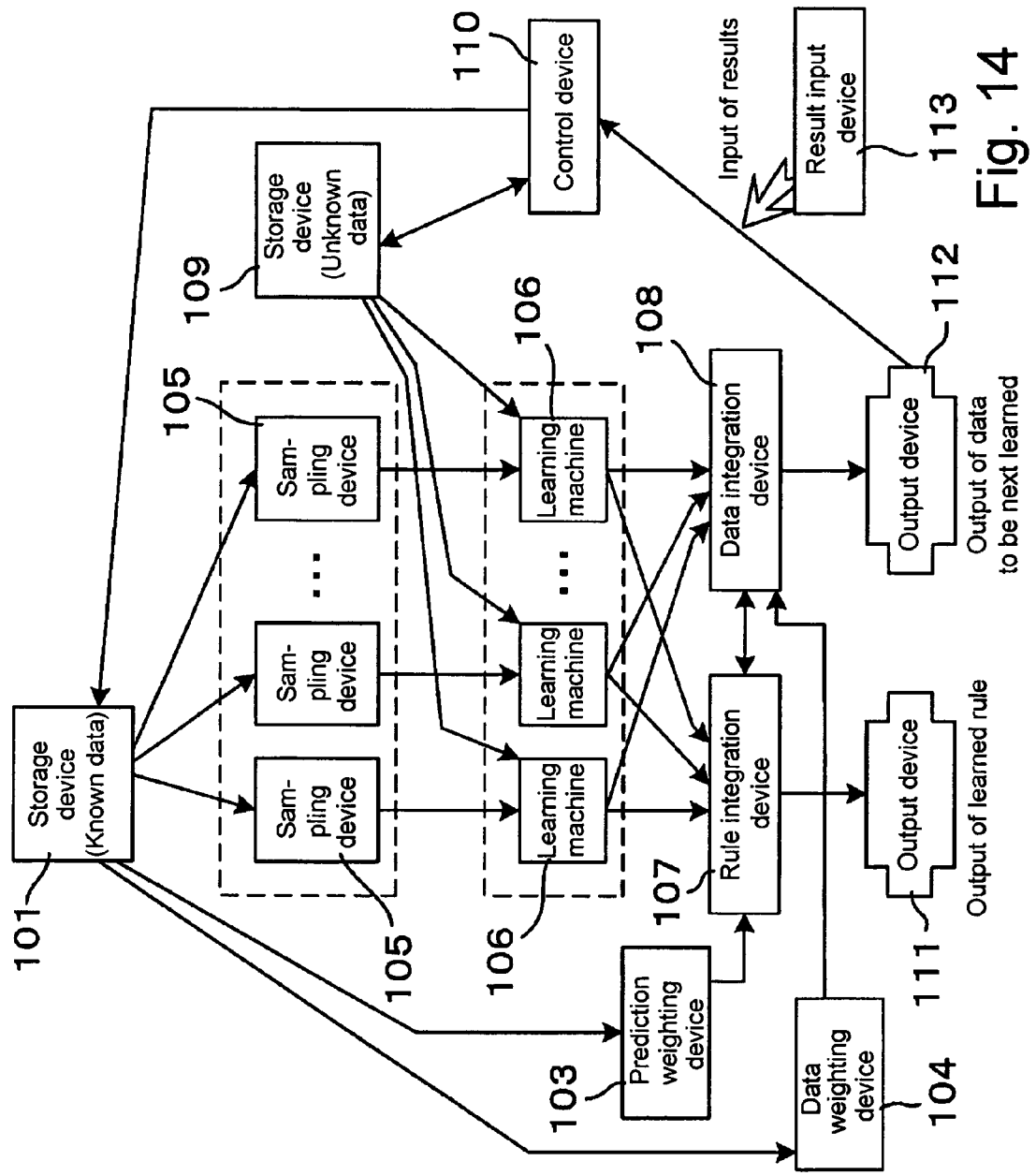
FIG. 14 is a block diagram illustrating the configuration of an active learning system according to a seventh embodiment of the present invention.

Next, a seventh embodiment of the present invention will be described with reference to FIG. 14. An active learning system illustrated in FIG. 14 is similar to the active learning system of the first embodiment, but differs from that of the first embodiment in that it is not provided with the sampling weighting device. With the omission of the sampling weighting device, each sampling device 15 uniformly handles all known data, and performs random sampling.

Figure 15A:
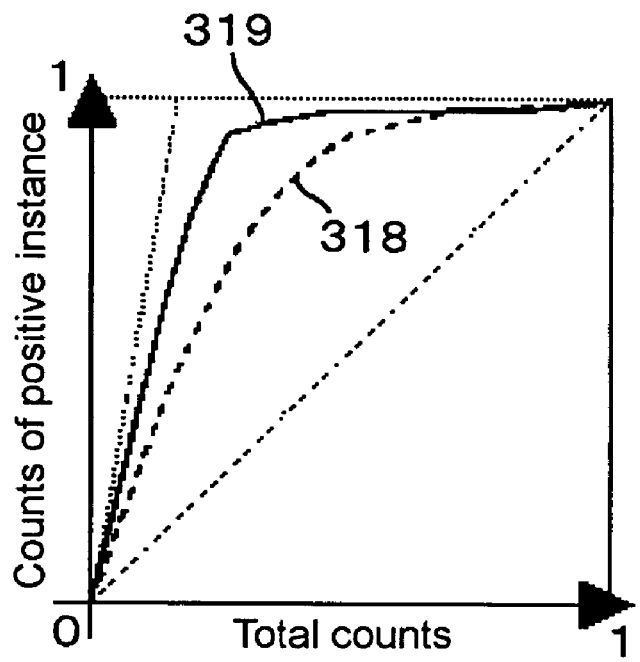
FIG. 15A is a graph showing hit rates for comparing the learning accuracy between the active learning method according to the system illustrated in FIG. 14 and the conventional active learning method.
Figure 15B:
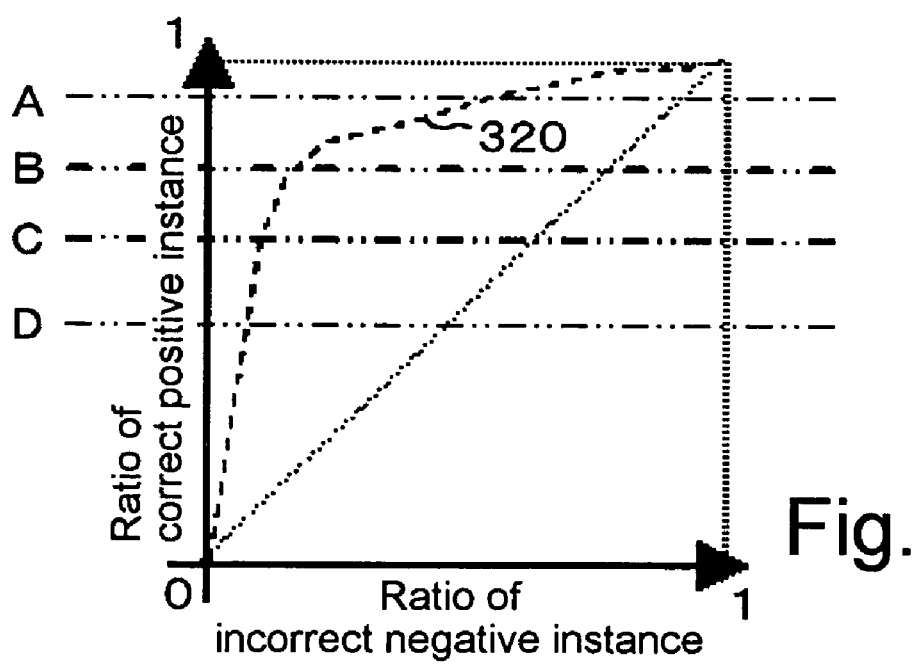
FIG. 15B is a graph showing ROC curves for comparing the learning accuracy between the active learning method according to the system illustrated in FIG. 14 and a conventional active learning method.

FIGS. 15A, 15B illustrate advantageous effects of the active learning system of the seventh embodiment. In FIG. 15A, broken line 318 indicates a hit rate when a conventional active learning method is used, and solid line 319 indicates a hit rate when the active learning system of the present embodiment is used. In FIG. 15B, broken line 320 indicates an ROC curve when the active learning system of the present embodiment is used. In the present embodiment, the weighting when data to be next learned is selected, as well as the weighting when learning results are integrated are performed such that a heavier weight is applied to a certain class (value). According to the present embodiment, data of the more heavily weighted class is delivered earlier, and the learning can be performed with an arbitrary accuracy, as indicated by A, B, C, D in the figure.

EIGHTH EMBODIMENT

Figure 16:
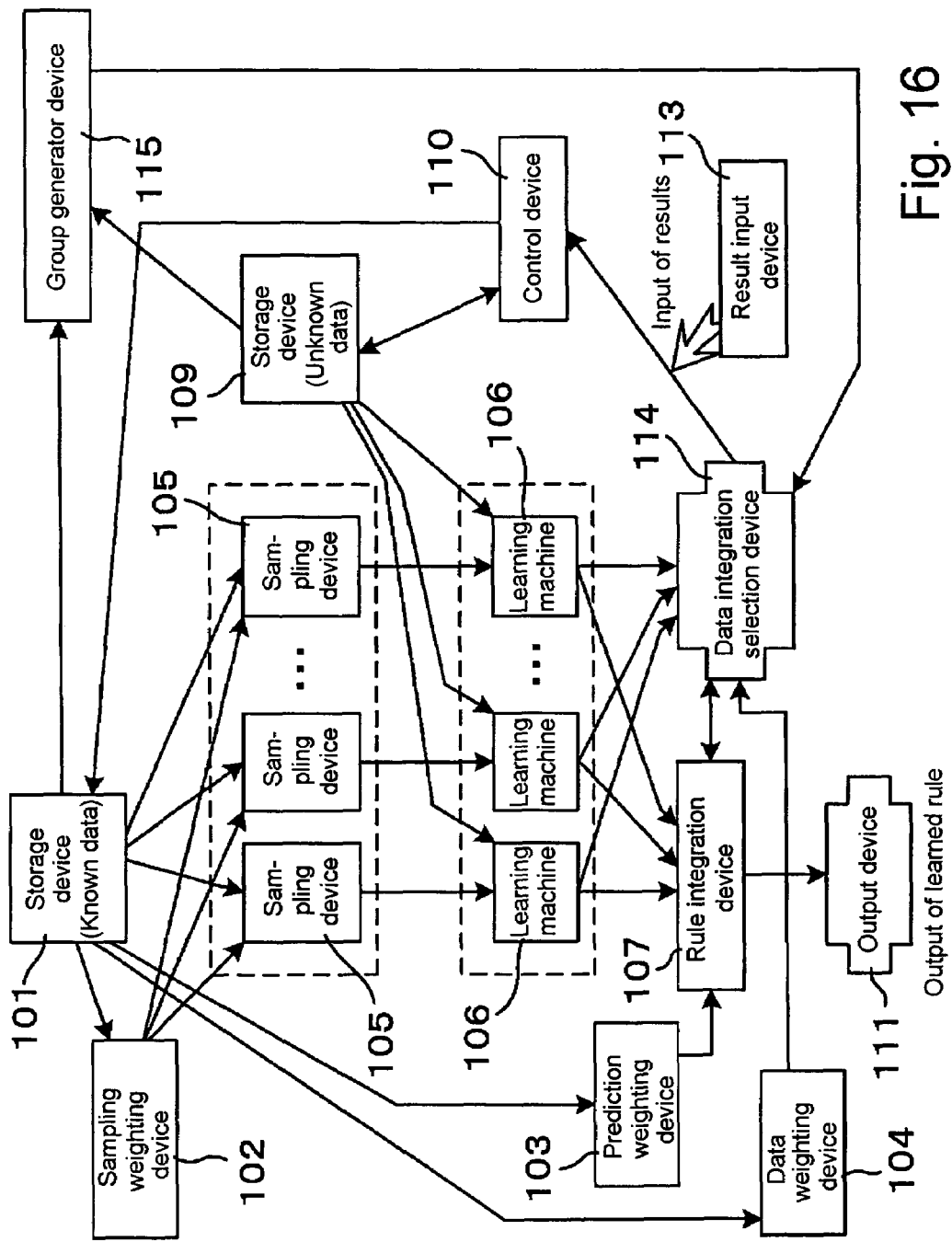
FIG. 16 is a block diagram illustrating the configuration of an active learning system according to an eighth embodiment of the present invention.

Next, an eighth embodiment of the present invention will be described with reference to FIG. 16. An active learning system illustrated in FIG. 16 is similar to the active learning system of the first embodiment, but differs from that of the first embodiment in that it is additionally provided with group generator device 115, and the data integration device and output device connected to this data integration device are replaced with data integration selection device 114. Data integration selection device 114, which has functions of both data integration device 108 and output device 112 in the system of the first embodiment (see FIG. 1), selects data to be next learned in accordance with grouping in group generator device 115 such that data disperse over as many groups as possible from one another. Group selection device 114 divides data having known label values and stored in storage device 101, or data having unknown label values and stored in storage device 109, or both data into groups.

Figure 17:
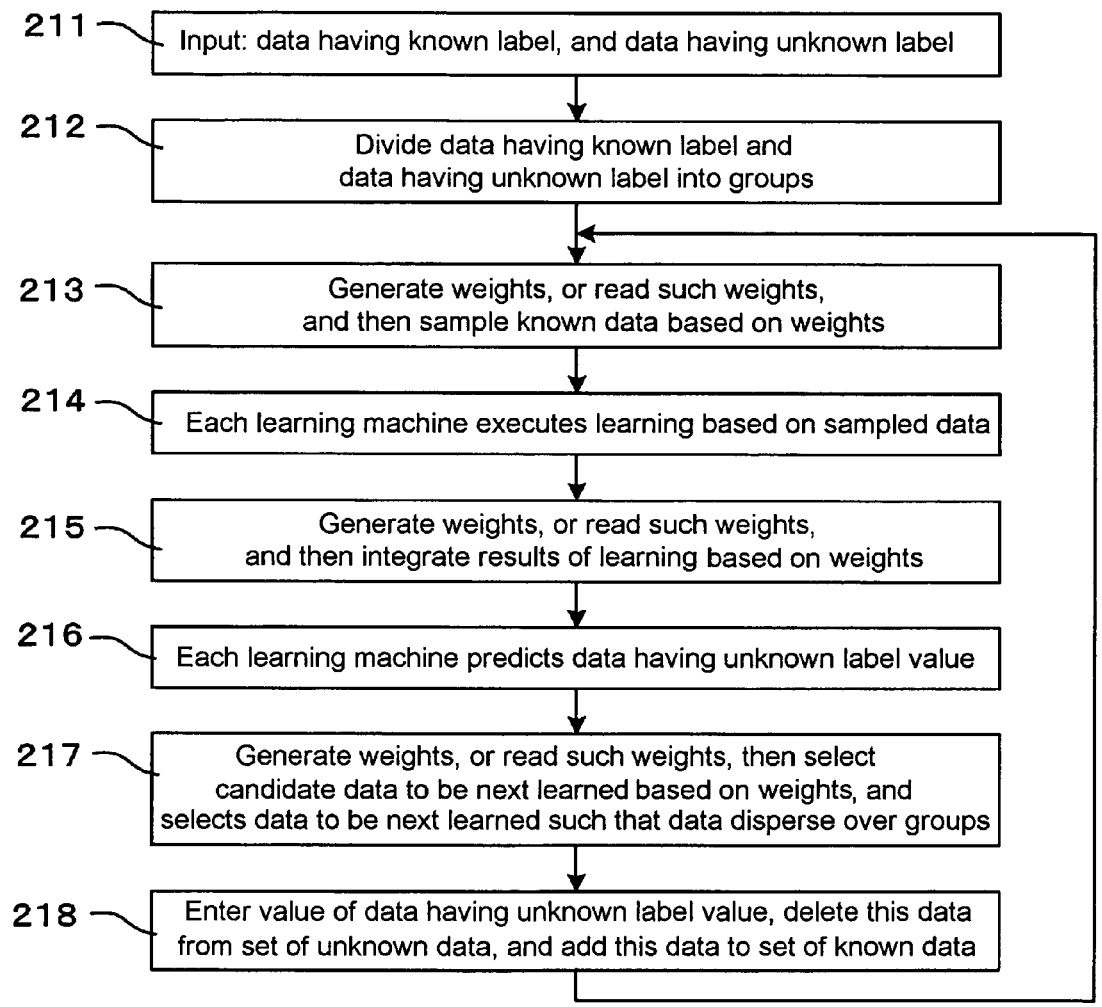
FIG. 17 is a flow chart illustrating a process of an active learning method using the system illustrated in FIG. 16.

Next, the operation of the active learning system of the present embodiment will be described with utilization of a flow chart illustrated in FIG. 17. Assume herein that data is given in a table format.

First, at step 211, data having known label values are stored in storage device 101, while data having unknown label values are stored in storage device 109. Group generator device 115 divides the known data in storage device 101 and the unknown data in storage device 109 into groups at step 212. The result of the grouping is delivered from group generator device 115 as group information.

Next, at step 213, sampling weighting device 102 generates weights (i.e., weighting data) based on the data sent from storage device 101, or reads such weights, and sends them to each sampling device 105. Each sampling device 105 samples the known data in storage device 101, while weighting the data in accordance with the weights sent from sampling weighting device 102, and sends the sampled data to corresponding learning machine 106. Each learning machine 106 executes the learning based on the data sent from the sampling device at step 214.

The data is also sent to prediction weighting device 103 from storage device 101, and prediction weighting device 103 generates weights (i.e., weighting data) based on the data sent from storage device 101, or reads such weights, and sends them to rule integration device 107 at step 215. Rule integration device 107 weights learning results from respective learning machines 106 based on the weighting data, while it summarizes these learning results. Rule integration device 107 sends the result of summarizing the learning results to output device 111 as a rule.

Next, at step 216, each learning machine 106 makes a prediction for the data having unknown label value, stored in storage device 109, and sends the result to data integration selection device 114.

In this event, the data is also sent to data weighting device 104 from storage device 101, and data weighting device 104 generates weights (i.e., weighting data) based on the data sent from storage device 101, or reads such weights, and sends them to data integration selection device 114 at step 217. Data integration selection device 114 weights predicted results from respective learning machines 106, while it summarizes these results, based on the weighting data and the group information from group generator device 115, to select data to be next learned. In this event, data integration selection device 114 selects data to be next learned in accordance with the grouping in group generator device 814, such that data disperse over as many groups as possible from one another.

Next, at step 218, a result (label value) for the data which should be next learned is entered manually or by a computer through result input device 113. The entered result is sent to control device 110, and control device 110 deletes the data, the result of which has been entered, from storage device 109, and instead stores the data in storage device 101. Subsequently, the foregoing process is repeated to advance the active learning in a manner similar to the first embodiment.

Figure 18:
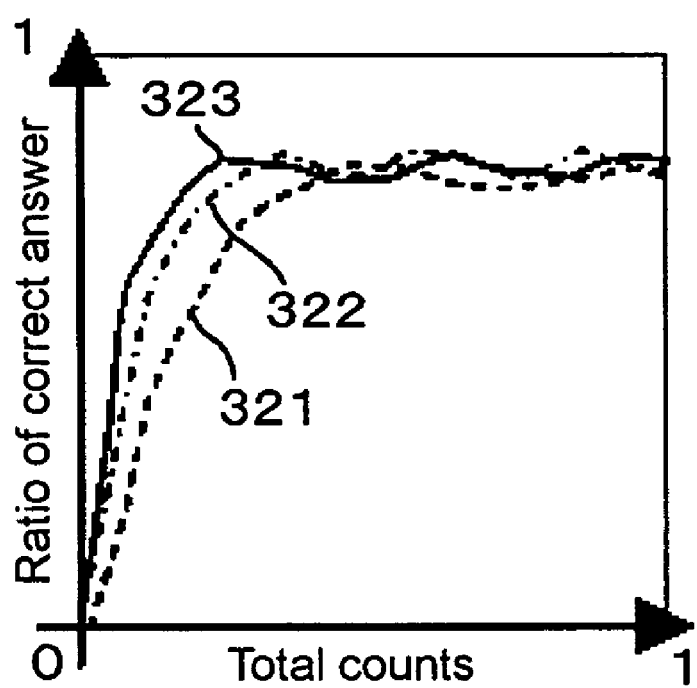
FIG. 18 is a graph showing transitions in correct answer rate for comparing the learning accuracy between the active learning method according to the system illustrated in FIG. 16 and the conventional active learning method.

FIG. 18 describes advantageous effects of the active learning system of the eighth embodiment. In the figure, broken line 321 indicates a transition in correct answer rate when a conventional active learning method is used, broken line 322 indicates a transition in correct answer rate when the active learning system of the first embodiment is used, and solid line 323 indicates a transition in correct answer rate when the active learning system of the present embodiment is used for selecting data to be next learned based on the group information created by group generator device 115. It is understood that the correct answer rate can be made high at an early stage by selecting data to be next learned such that data belong to as many different groups as possible from one another when the data are selected based on the group information generated by the group generator device.

Alternatively, the present embodiment can be configured with the omission of some or all of sampling weighting device 102, prediction weighting device 103, and data weight device 104.

NINTH EMBODIMENT

Figure 19:
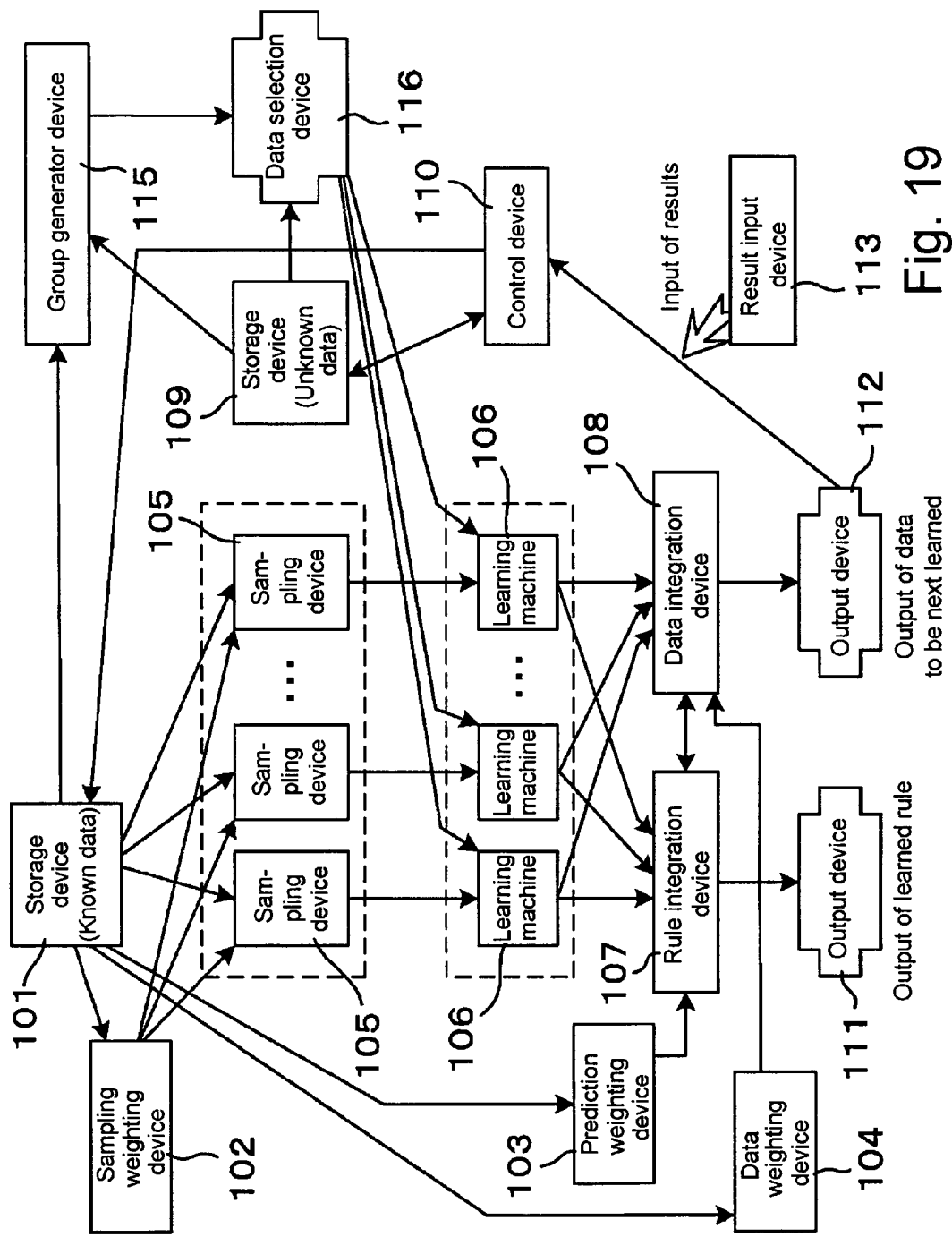
FIG. 19 is a block diagram illustrating the configuration of an active learning system according to a ninth embodiment of the present invention.

Next, a ninth embodiment of the present invention will be described with reference to FIG. 19. An active learning system illustrated in FIG. 19 is similar to the active learning system of the eighth embodiment, but differs from that of the eighth embodiment in that it is newly provided with data selection device 116, and is provided with data integration device 108 and output device 112 similar to those of the first embodiment, instead of the data integration selection device. Data selection device 118 selects unknown data intended for a prediction in each learning machine 106 from storage device 109 in accordance with group information from group generator device 115, and sends the selected unknown data to each learning machine 106.

In this active learning system, groups generated by group generator device 115 are sent to data selection device 116. Unknown data is sent to data selection device 116 from storage device 109. Data selection device 116 selects unknown data such that they disperse over as many different groups as possible from one another, and the selected data is sent to learning machines 106 for prediction. Data integration device 108 applies the weighting determined by data weighting device 904 to select data to be next learned. This active learning system produces similar advantageous effects to those of the active learning system of the eighth embodiment.

Alternatively, this embodiment can be configured with the omission of some or all of sampling weighting device 102, prediction weighting device 103, and data weight device 104.

The active learning system described above can be implemented by reading a computer program for implementing the same into a computer such as a personal computer, a workstation or the like, and causes it to execute the program. The program for performing the active learning (program for the active learning system) is read into a computer by a recording medium such as a magnetic tape, CD-ROM or the like, or through a network. Generally, such a computer comprises a CPU, a hard disk drive for storing programs and data, a main memory, input devices such as a key board, a mouse and the like, a display device such as CRT, liquid crystal display or the like, a reader for reading a recording medium such as a magnetic tape, CD-ROM or the like, and a communications interface serving as an interface with a network. The hard disk drive, main memory, input devices, display device, reader, and communications interface are all connected to the CPU. In this computer, the reader is loaded with a recording medium which stores a program for executing the active learning to read the program from the recording medium for storage in the hard disk drive, or such a program is downloaded from the network for storage in the hard disk drive, and then, the program stored in the hard disk drive is executed by the CPU to perform the aforementioned active learning.

Accordingly, the foregoing program, a recording medium which stores such a program, and a program product comprising such a program are also included in the scope of the present invention.

The invention claimed is:

1. A label prediction method for predicting a label value of unknown data using a storage device for storing a set of known data and a set of unknown data, and a plurality of learning machines, said known data being data having known label values, and said unknown data being data having unknown label values, said method comprising:
   (a) sampling, using said plurality of learning machines, the known data from said storage device independently of one another, to learn the known data;
   (b) integrating and delivering output results of said plurality of learning machines;
   (c) retrieving, using said plurality of learning machines, the unknown data from said storage device to make a prediction of a label value of said unknown data by using the results of the learning machines;
   (d) selecting data to be next learned based on the result of the prediction of the label value of the unknown data;
   (e) entering a label value corresponding to the selected data to be next learned; and
   (f) deleting the data, the label value of which has been entered, from the set of unknown data, and adding the data to the set of known data,
   wherein the method further comprises performing at least one of: (i) non-uniform weighting of the known data at the time of sampling the known data; (ii) non-uniform weighting of the results of the learning machines at the time of integrating the results of the learning by said plurality of learning machines; and (iii) non-uniform weighting of the data to be next learned at the time of selecting the data to be next learned based on the predictions by said plurality of learning machines.

2. The label prediction method according to claim 1, further comprising dividing the known data and the unknown data into groups, wherein data are selected to disperse over groups when the data to be next learned is calculated.

3. The label prediction method according to claim 1, further comprising dividing the known data and the unknown data into groups, wherein the unknown data are supplied to said each learning machine such that the unknown data disperse over groups.

4. A label prediction system for predicting a label value of unknown data comprising:
   a storage device for storing a set of known data and a set of unknown data, said known data being data having known label values, and said unknown data being data having unknown label values;
   a plurality of learning machines for learning the known data and predicting the unknown data;
   a plurality of sampling devices provided for each of said learning machines for sampling the known data from said storage device and supplying the sampled data to said learning machines corresponding thereto;
   first integrating means for integrating results of learning performed by said respective learning machines based on the known data;
   second integrating means for selecting data to be next learned from results of the predictions of the label value of the unknown data performed by said respective learning machines, and delivering the data to be next learned;
   result input means for entering a label value corresponding to the data to be next learned;
   control means for deleting the data, the label value of which has been entered, from the set of unknown data, and adding the data to the set of known data; and
   sampling weighting means for setting a weight at the time of sampling for each of said sampling devices,
   wherein said learning machines learn the known data supplied from the sampling devices and predict the label values of the unknown data using the results of the learning.

5. A label prediction system for predicting a label value of known data comprising:
   a storage device for storing a set of known data and a set of unknown data, said known data being data having known label values, and said unknown data being data having unknown label values;
   a plurality of learning machines for learning the known data and predicting the unknown data;
   a plurality of sampling devices provided for each of said learning machines for sampling the known data from said storage device and supplying the sampled data to said learning machines corresponding thereto;
   first integrating means for integrating results of learning performed by said respective learning machines based on the known data;
   second integrating means for selecting data to be next learned from results of the predictions of the label value of the unknown data performed by said respective learning machines, and delivering the data to be next learned;
   result input means for entering a label value corresponding to the data to be next learned;
   control means for deleting the data, the label value of which has been entered, from the set of unknown data, and adding the data to the set of known data; and
   prediction weighting means for setting weights for use by said first integrating means to integrate the results of learning,
   wherein said learning machines learn the known data supplied from the sampling devices and predict the label values of the unknown data using the results of the learning.

6. The label prediction system according to claim 4, comprising prediction weighting means for setting weights for use by said first integrating means to integrate the results of learning.

7. The label prediction system according to claim 4, comprising data weighting means for setting weights for use by said second integrating means to select data to be next learned.

8. The label prediction system according to claim 4, further comprising group generating means for performing grouping of the known data and the unknown data,
   wherein said second integrating means selects data such that the data disperse over groups upon calculation of the data to be next learned.

9. The label prediction system according to claim 4, further comprising:
   group generating means for performing grouping of the known data and the unknown data; and
   data selecting means for supplying said each learning machine with the unknown data such that the unknown data disperse over groups.

10. A label prediction system for predicting a label value of unknown data comprising:
    a storage device for storing a set of known data and a set of unknown data, said known data being data having known label values, and said unknown data being data having unknown label values;
    a plurality of learning machines for learning the known data and predicting the unknown data;
    a plurality of sampling devices provided for each of said learning machines for sampling the known data from said storage device and supplying the sampled data to said learning machines corresponding thereto;

first integrating means for integrating results of learning performed by said respective learning machines based on the known data;

second integrating means for selecting data to be next learned from results of the predictions of the label value of the unknown data performed by said respective learning machines, and delivering the data to be next learned;

result input means for entering a label value corresponding to the data to be next learned;

control means for deleting the data, the label value of which has been entered, from the set of unknown data, and adding the data to the set of known data; and data weighting means for setting weights for use by said second integrating means to select data to be next learned, wherein said learning machines learn the known data supplied from the sampling devices and predict the label values of the unknown data using the results of the learning.

11. The label prediction system according to claim 10, further comprising group generating means for performing grouping of the known data and the unknown data, wherein said second integrating means selects data such that the data disperse over groups upon calculation of the data to be next learned.

12. The label prediction system according to claim 10, further comprising:

group generating means for performing grouping of the known data and the unknown data; and data selecting means for supplying said each learning machine with the unknown data such that the unknown data disperse over groups.

13. A label prediction system for predicting a label value of unknown data, comprising:

a storage device for storing a set of known data and a set of unknown data, said known data being data having known label values, and said unknown data being data having unknown label values;

a plurality of learning machines for learning the known data and predicting the unknown data;

a plurality of sampling devices provided for each of said learning machines for sampling the known data from said storage device and supplying the sampled data to said learning machines corresponding thereto;

first integrating means for integrating results of learning performed by said respective learning machines based on the known data;

second integrating means for selecting data to be next learned from results of the predictions of the label value of the unknown data performed by said respective learning machines, and delivering the data to be next learned;

result input means for entering a label value corresponding to the data to be next learned;

control means for deleting the data, the label value of which has been entered, from the set of unknown data, and adding the data to the set of known data; and group generating means for performing grouping of the known data and the unknown data, wherein said learning machines learn the known data supplied from the sampling devices and predict the label values of the unknown data using the results of the learning, and wherein said second integrating means selects data such that the data disperse over groups upon calculation of the data to be next learned.

14. A label prediction system for predicting a label value of unknown data, comprising:

a storage device for storing a set of known data and a set of unknown data, said known data being data having known label values, and said unknown data being data having unknown label values;

a plurality of learning machines for learning the known data and predicting the unknown data;

a plurality of sampling devices provided for each of said learning machines for sampling the known data from said storage device and supplying the sampled data to said learning machines corresponding thereto;

first integrating means for integrating results of learning performed by said respective learning machines based on the known data;

second integrating means for selecting data to be next learned from results of the predictions of the label value of the unknown data performed by said respective learning machines, and delivering the data to be next learned;

result input means for entering a label value corresponding to the data to be next learned;

control means for deleting the data, the label value of which has been entered, from the set of unknown data, and adding the data to the set of known data;

group generating means for performing grouping of the known data and the unknown data; and data selecting means for supplying said each learning machine with the unknown data such that the unknown data disperse over groups, wherein said learning machines learn the known data supplied from the sampling devices and predict the label values of the unknown data using the results of the learning.

15. A computer program product for causing a computer to perform label prediction for predicting a label value of unknown data, said computer program product including a computer readable medium bearing software instructions for enabling said computer to perform predetermined operations comprising:

storing, using a storing means, a set of known data and a set of unknown data, said known data being data having known label values, and said unknown data being data having unknown label values;

sampling, using a plurality of learning means, the known data from said storage means, and learning the known data and predicting the unknown data;

integrating, using a first integrating means, results of learning performed by said respective learning means based on the known data;

selecting, using a second integrating means, data to be next learned from results of the predictions of the label value of the unknown data performed by said respective learning means, and delivering the data to be next learned;

entering, using a result input means, a label value corresponding to the data to be next learned;

deleting, using a control means, the data, the label value of which has been entered, from the set of unknown data, and adding the data to the set of known data; and setting, using a weighting means, at least one of: weights during the sampling in said sampling device; weights for use by said first integrating means; and weights for use by said second integrating means, wherein said learning means learn the known data sampled from said storage means and predicts the label values of the unknown data using the results of the learning.

16. The computer program product according to claim 15, said predetermined operations further comprising performing, using a group generating means, grouping of the known data and the unknown data, wherein data are selected such that the data disperse over groups when said second integrating means calculates the data to be next learned.

17. The computer program product according to claim 15, said predetermined operations further comprising:
performing, using a group generating means, grouping of the known data and the unknown data; and
supplying, using a data selecting means, said each learning machine with the unknown data such that the unknown data disperse over groups.

18. The label prediction system according to claim 6, comprising data weighting means for setting weights for use by said second integrating means to select data to be next learned.

19. The label prediction system according to claim 6, further comprising group generating means for performing grouping of the known data and the unknown data,
wherein said second integrating means selects data such that the data disperse over groups upon calculation of the data to be next learned.

20. The label prediction system according to claim 6, further comprising:
group generating means for performing grouping of the known data and the unknown data; and
data selecting means for supplying said each learning machine with the unknown data such that the unknown data disperse over groups.

21. The label prediction system according to claim 7, further comprising group generating means for performing grouping of the known data and the unknown data,
wherein said second integrating means selects data such that the data disperse over groups upon calculation of the data to be next learned.

22. The label prediction system according to claim 7, further comprising:
group generating means for performing grouping of the known data and the unknown data; and
data selecting means for supplying said each learning machine with the unknown data such that the unknown data disperse over groups.

23. The label prediction system according to claim 18, further comprising group generating means for performing grouping of the known data and the unknown data,
wherein said second integrating means selects data such that the data disperse over groups upon calculation of the data to be next learned.

24. The label prediction system according to claim 18, further comprising:
group generating means for performing grouping of the known data and the unknown data; and
data selecting means for supplying said each learning machine with the unknown data such that the unknown data disperse over groups.

25. The label prediction system according to claim 5, comprising data weighting means for setting weights for use by said second integrating means to select data to be next learned.

26. The label prediction system according to claim 5, further comprising group generating means for performing grouping of the known data and the unknown data,
wherein said second integrating means selects data such that the data disperse over groups upon calculation of the data to be next learned.

27. The label prediction system according to claim 5, further comprising:
group generating means for performing grouping of the known data and the unknown data; and
data selecting means for supplying said each learning machine with the unknown data such that the unknown data disperse over groups.

28. The label prediction system according to claim 25, further comprising group generating means for performing grouping of the known data and the unknown data,
wherein said second integrating means selects data such that the data disperse over groups upon calculation of the data to be next learned.

29. The label prediction system according to claim 25, further comprising:
group generating means for performing grouping of the known data and the unknown data; and
data selecting means for supplying said each learning machine with the unknown data such that the unknown data disperse over groups.

30. The label prediction method according to claim 1, further comprising repeating (a) to (f);
wherein the set of known data to which the data, the label value of which has been entered, is added in (f) is used in (a) as the known data, and
wherein the set of unknown data from which the data, the label value of which has been entered, is deleted in (f) is used in (c) as the unknown data.

* * * * *